United States Patent
Bowden et al.

(10) Patent No.: US 12,448,139 B2
(45) Date of Patent: Oct. 21, 2025

(54) OPEN ROTOR PYLON FAIRING

(71) Applicants: General Electric Company, Schenectady, NY (US); General Electric Company Polska sp. z o.o., Warsaw (PL)

(72) Inventors: William Joseph Bowden, Cleves, OH (US); Lukasz Ignacy Mazurkiewicz, Warsaw (PL); Syed Arif Khalid, West Chester, OH (US); Trevor Howard Wood, Clifton Park, NY (US)

(73) Assignees: General Electric Company, Evendale, OH (US); General Electric Company Polska sp. z o.o., Warsaw (PL)

( * ) Notice: Subject to any disclaimer, the term of this patent is extended or adjusted under 35 U.S.C. 154(b) by 0 days.

(21) Appl. No.: 18/307,110

(22) Filed: Apr. 26, 2023

(65) Prior Publication Data
US 2024/0239503 A1 Jul. 18, 2024

(30) Foreign Application Priority Data
Jan. 17, 2023 (PL) .......................................... 443512

(51) Int. Cl.
| | | |
|---|---|---|
| B64D 29/02 | (2006.01) | |
| B64D 27/12 | (2006.01) | |
| B64D 27/40 | (2024.01) | |

(52) U.S. Cl.
CPC ............. B64D 29/02 (2013.01); B64D 27/12 (2013.01); B64D 27/402 (2024.01)

(58) Field of Classification Search
CPC ...... B64D 27/12; B64D 27/40; B64D 27/402; B64D 29/02
See application file for complete search history.

(56) References Cited

U.S. PATENT DOCUMENTS

| | | | | |
|---|---|---|---|---|
| 4,976,102 | A * | 12/1990 | Taylor | F02C 7/20 416/129 |
| 8,444,085 | B2 | 5/2013 | Stretton et al. | |
| 8,689,538 | B2 * | 4/2014 | Sankrithi | F01D 7/00 60/226.1 |
| 8,720,815 | B2 | 5/2014 | Vetters et al. | |
| 9,567,090 | B2 * | 2/2017 | Gallet | B64D 27/40 |
| 9,938,901 | B2 * | 4/2018 | Bodard | B64D 29/02 |
| 9,950,803 | B2 * | 4/2018 | Yu | B64C 7/02 |
| 10,040,559 | B2 | 8/2018 | Hoisington | |
| 10,240,561 | B2 * | 3/2019 | Zsurka | F01D 5/141 |

(Continued)

*Primary Examiner* — Philip J Bonzell
*Assistant Examiner* — Michael B. Kreiner
(74) *Attorney, Agent, or Firm* — Dority & Manning, P.A.

(57) ABSTRACT

An aircraft defining a longitudinal centerline and extending between a forward end and an aft end is provided. The aircraft comprises a fuselage extending between the forward end of the aircraft and the aft end of the aircraft; a wing assembly extending laterally outwardly with respect to the longitudinal centerline from a portion of the fuselage; an unducted turbofan engine including an unducted fan defining a fan diameter; and a pylon fairing that connects the unducted turbofan engine to the wing assembly, the pylon fairing defining a leading edge and including a first inflection point along the leading edge, the first inflection point defining a first radius of curvature that is less than 5 times the fan diameter and greater than 0.1 times the fan diameter.

16 Claims, 17 Drawing Sheets

(56) References Cited

U.S. PATENT DOCUMENTS

| | | | |
|---|---|---|---|
| 10,556,699 B2* | 2/2020 | Pautis | B64D 27/14 |
| 10,710,734 B2 | 7/2020 | Sankrithi | |
| 10,907,578 B2 | 2/2021 | Sankrithi | |
| 11,306,681 B2* | 4/2022 | Acheson | B64D 33/04 |
| 12,043,368 B2* | 7/2024 | Chakrabarti | B64C 11/008 |
| 2021/0108597 A1* | 4/2021 | Ostdiek | F02C 6/206 |

* cited by examiner

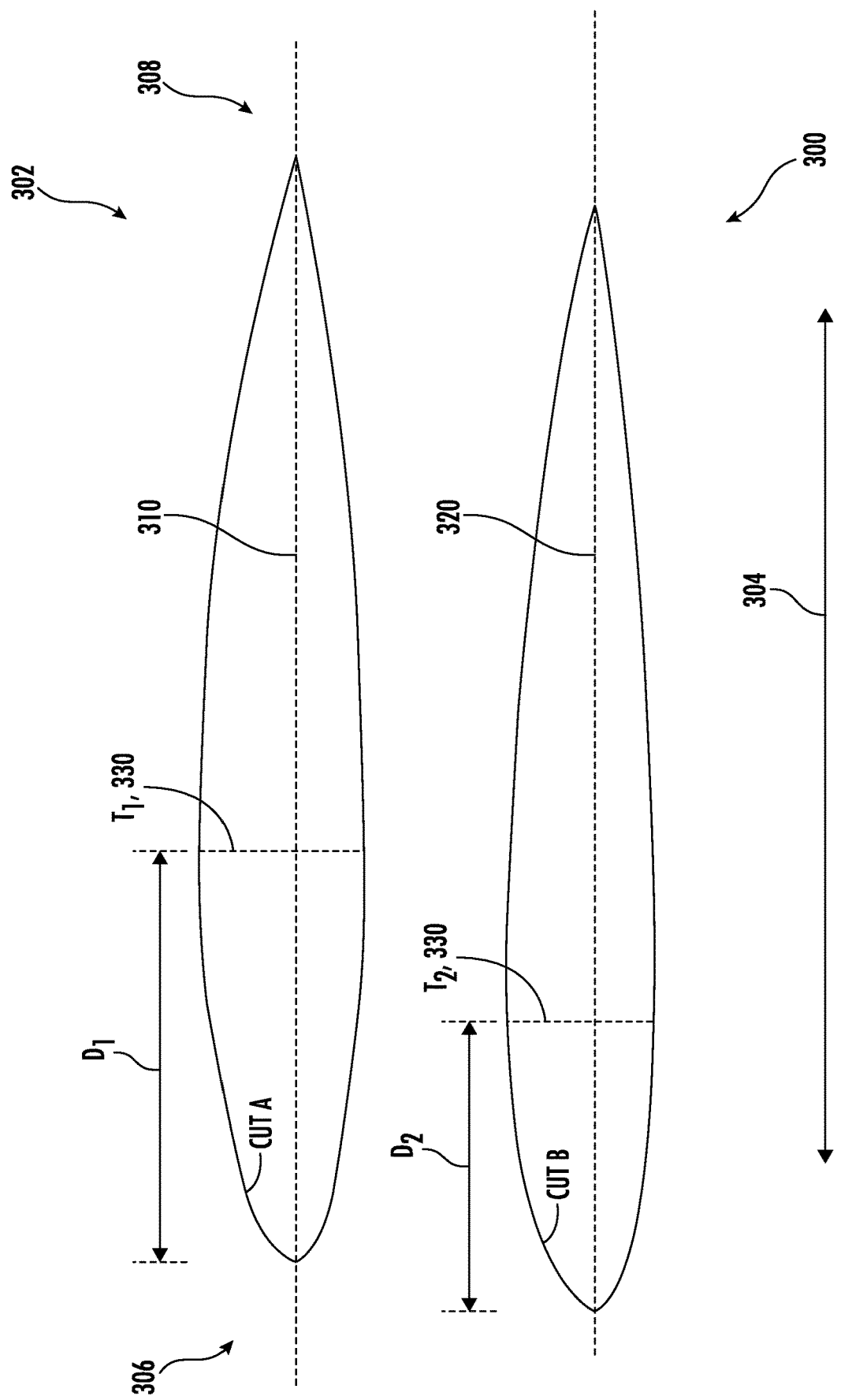

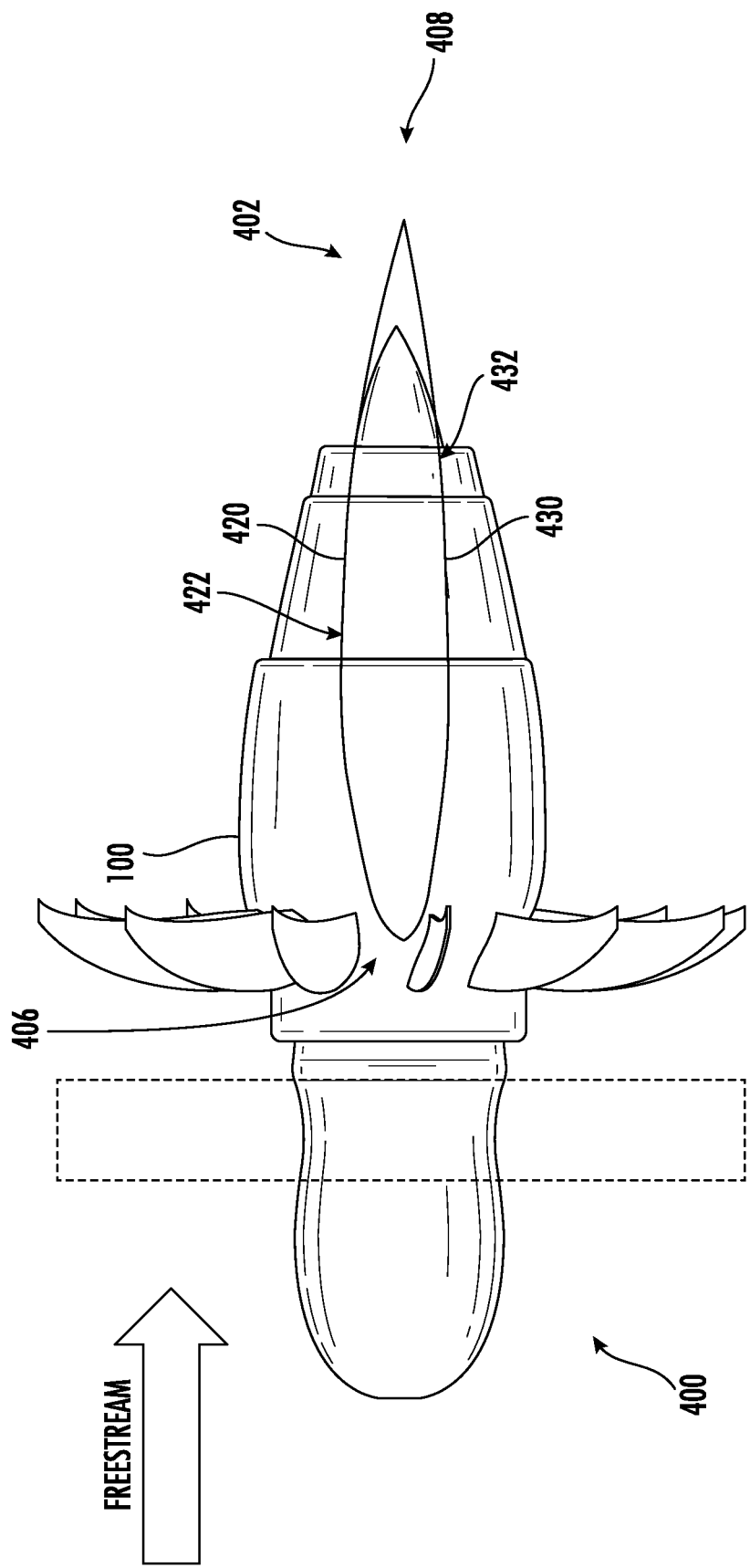

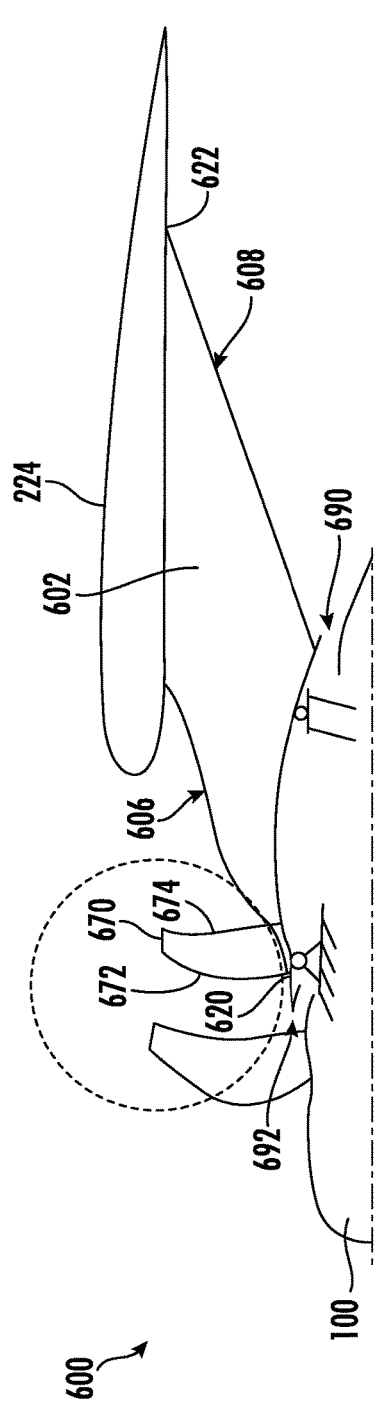
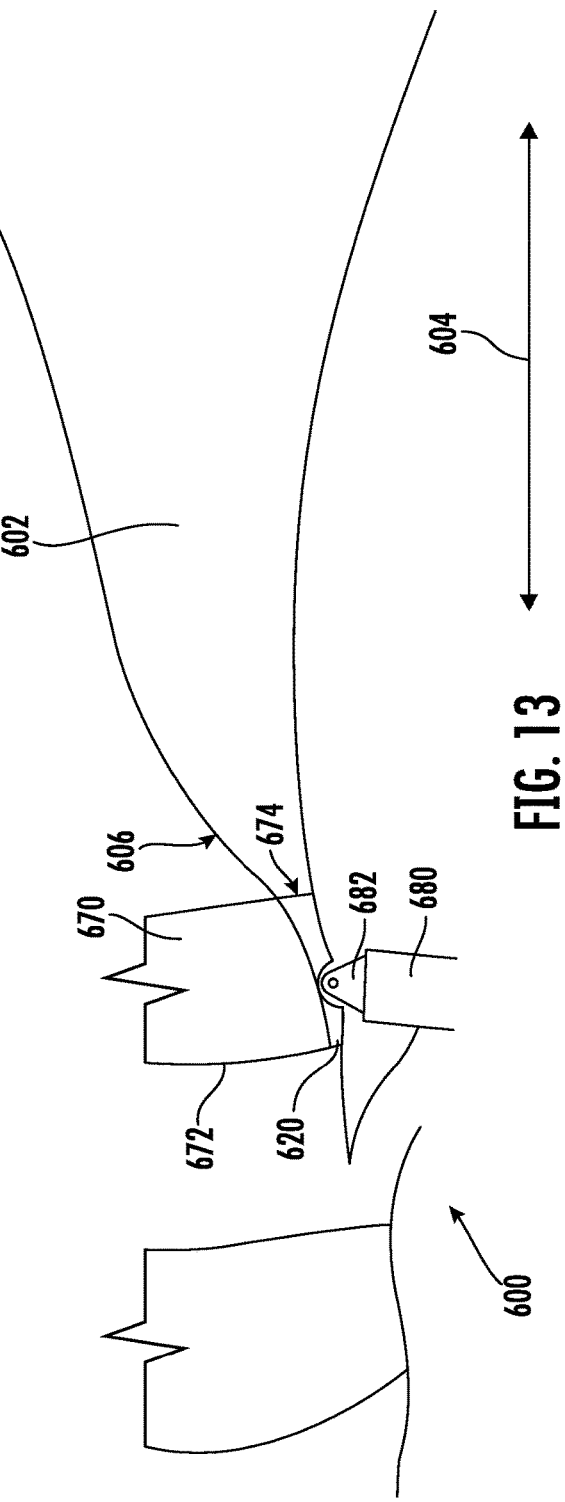
FIG. 12
FIG. 13

OPEN ROTOR PYLON FAIRING

PRIORITY INFORMATION

The present application claims priority to Polish Patent Application Number P.443512 filed on Jan. 17, 2023.

TECHNICAL FIELD

The present subject matter relates generally to a gas turbine engine, or more particularly to a gas turbine engine having an unducted fan.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Other types of engines include propfan engines, turbojet engines, turboshaft engines, turboprop engines, turbofan engines, and unducted turbine engines.

Some engines include a rotor assembly with a single stage of unducted rotor blades. Such a rotor assembly is referred to as an "unducted fan," or the entire engine may be referred to as an "unducted engine," or an engine having an open rotor propulsion system.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 7 is a cross-section view of a first chord (CUT A) of a pylon fairing at a first position, and a second chord (CUT B) of a pylon fairing at a second position, with the first chord and the second chord shown separated according to another exemplary embodiment of the present subject matter.

FIG. 8 is a perspective view of an open rotor pylon system including a pylon fairing according to another exemplary embodiment of the present subject matter.

FIG. 12 is a side elevation view of an open rotor pylon system including a pylon fairing according to another exemplary embodiment of the present subject matter.

FIG. 13 is a schematic view of an open rotor pylon system including a pylon fairing according to another exemplary embodiment of the present subject matter.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
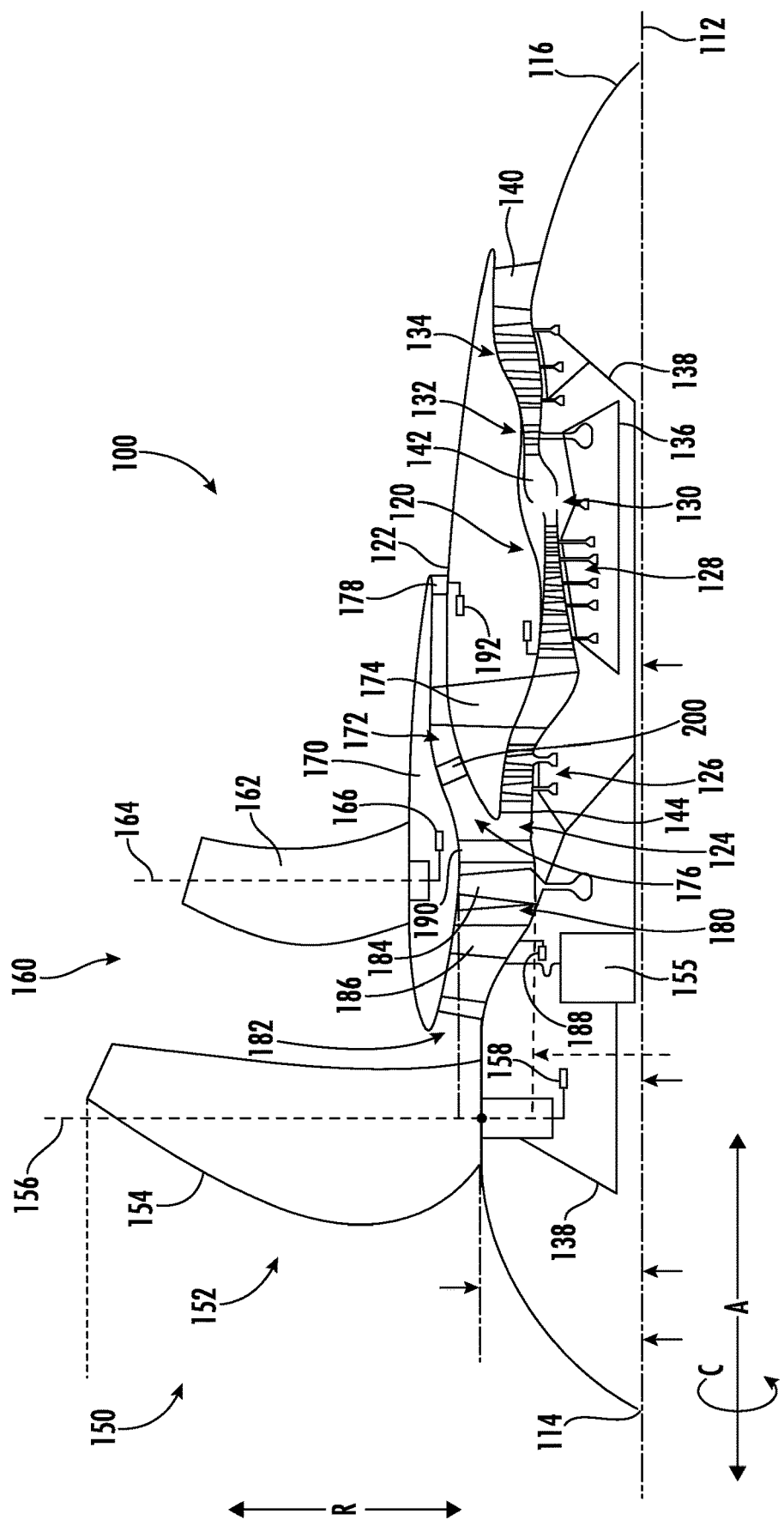
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "vertical", "horizontal", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to aerodynamically designed pylon fairings that enable improved performance, acoustics, and compatibility with the aircraft controllability. Open rotor or open fan installations uniquely have rotor or fan stream exhaust washing a pylon fairing that connects the engine to the aircraft. Traditional turbofans only have a freestream flow scrubbing the pylon fairing and such a flow does not have swirl. An open fan's exhaust scrubs the pylon fairing with a swirling flow of higher velocity than such a freestream flow. This results in a greater risk of higher drag and a loss of efficiency. The aerodynamically designed pylon fairings of the present disclosure improve performance in such conditions.

Referring now to FIG. 1, a schematic cross-sectional view of a gas turbine engine 100, (also referred to herein as "engine 10"), is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below. As used herein, the term "first stream" or "free stream" refers to a stream that flows outside of the engine inlet and over a fan, which is unducted. Furthermore, the first stream is a stream of air that is free stream air. As used herein, the term "second stream" or "core stream" refers to a stream that flows through the engine inlet and the ducted fan and also travels through the core inlet and the core duct. As used herein, the term "third stream" or "mid-fan stream" refers to a stream that flows through an engine inlet and a ducted fan but does not travel through a core inlet and a core duct. Furthermore, the third stream is a stream of air that takes inlet air as opposed to free stream air. The third stream goes through at least one stage of the turbomachine, e.g., the ducted fan.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through fan duct 172 as a heat sink and correspondingly increases the temperature of the air downstream of the heat exchanger 200 and exiting the fan exhaust nozzle 178.

Figure 2:
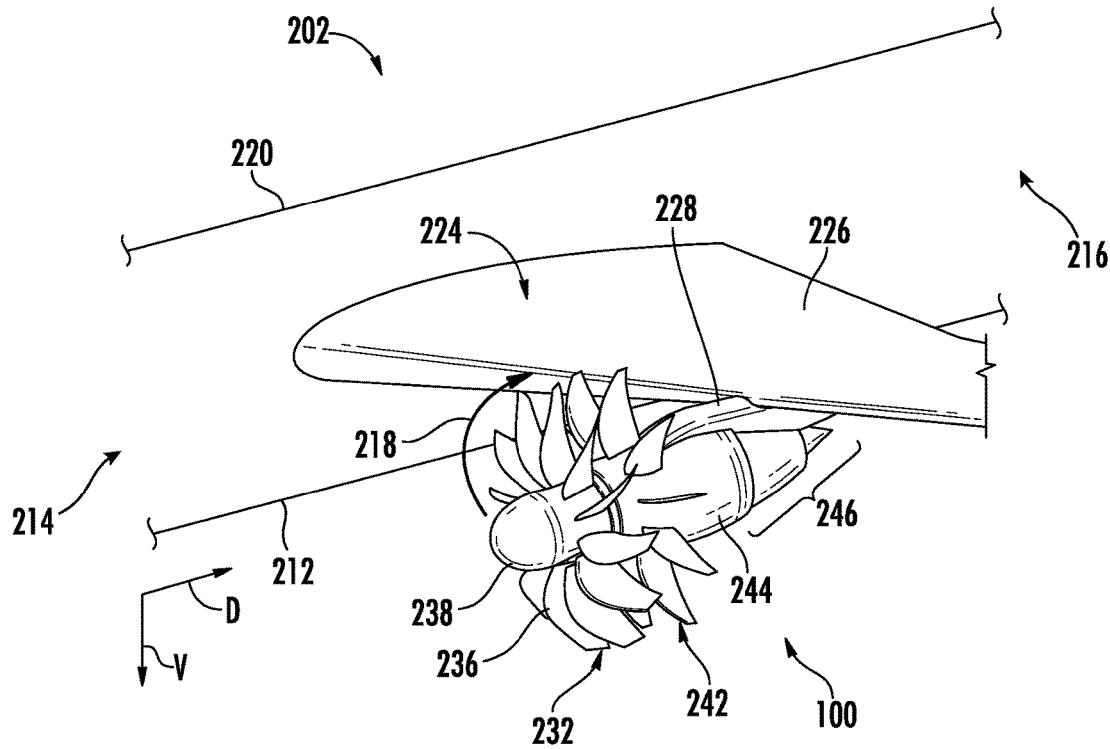
FIG. 2 is a perspective view of a portion of an aircraft having an unducted turbofan engine according to an exemplary embodiment of the present subject matter.
Figure 3:
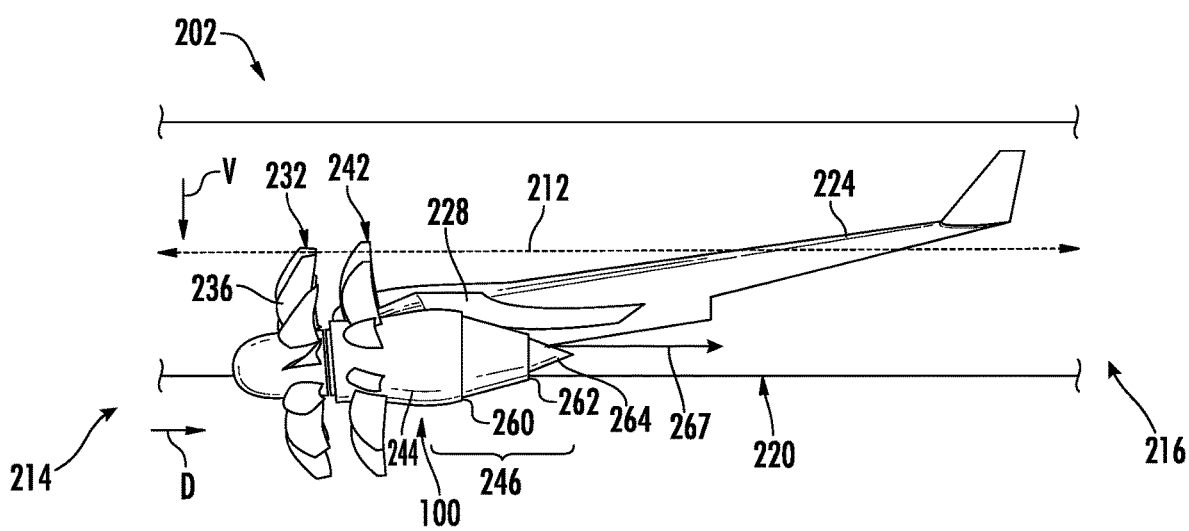
FIG. 3 is a side view of the aircraft of FIG. 2 according to an exemplary embodiment of the present subject matter.

Referring now to FIG. 2, a perspective view of a portion of an aircraft 202 having an unducted turbofan engine 100 will be discussed. Referring also to FIG. 3, a side view of the aircraft 202 is also provided.

The aircraft 202 includes a fuselage 220, a wing 224 (with an upper surface 226), a pylon fairing 228, and the unducted turbofan engine 100, and defines a vertical direction V and a downstream direction D. In this example, downstream direction D is a direction of airflow from a front or forward end 214 (e.g., to the left in FIG. 1) of aircraft 202 to a rear or aft end 216 (e.g., to the right in FIG. 1) of aircraft 202. The unducted turbofan engine 100 of the aircraft 202 includes a fan 232 having a plurality of fan blades 236, a spinner or nose 238, stationary guide vanes 242, a casing 244, and an exhaust section 246. Further, fan 232 defines a direction of rotation 218.

As will be appreciated from the view of FIG. 3, aircraft 202 further defines a fuselage centerline 212, and the unducted turbofan engine 100 further includes a bypass outlet nozzle 260, an outlet nozzle 262, and a core plug 264, and defines an exhaust stream 267.

The fuselage 220 is a main body or vessel section of aircraft 202 that contains cargo, passengers, a crew, or a combination thereof during normal operation. The wing 224 is an aerodynamic portion of aircraft 202 that provides lift for aircraft 202. The wing 224 is mounted to and extends from fuselage 220. The upper surface 226 is a surface extending along a top-side of wing 224 relative to vertical direction V (shown as pointing downwards in FIG. 2). As will be appreciated, the wing 224 may define an airfoil shape, and upper surface 226 may be a suction side of the airfoil. Such a configuration may cause an upwash of the airflow approaching the wing 224 during flight.

Figure 4:
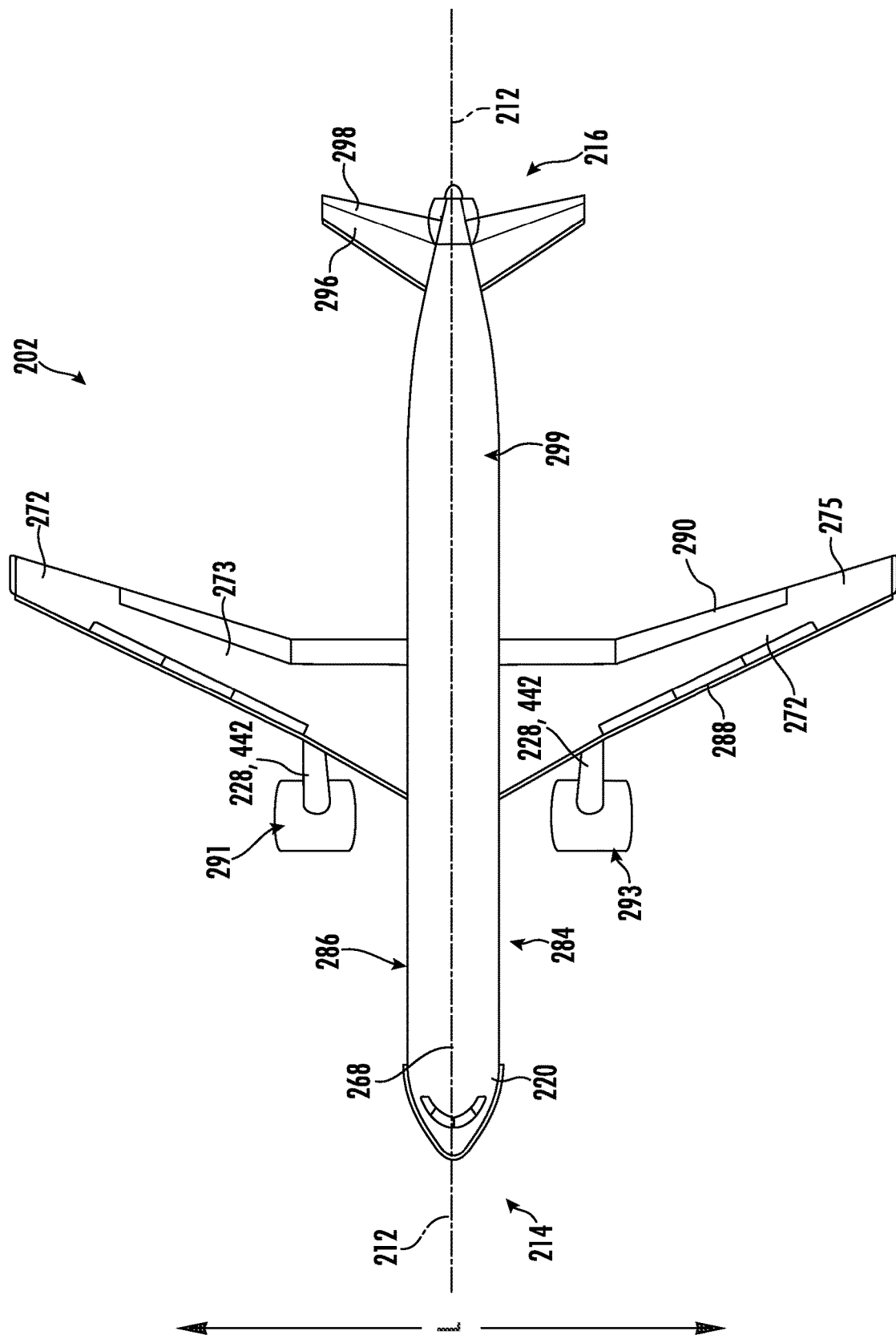
FIG. 4 is a top view of an exemplary aircraft according to an exemplary embodiment of the present subject matter.

Referring now also to FIG. 4, a top view of an exemplary aircraft 202 according to another embodiment of the present disclosure is provided. FIG. 4 provides an aircraft 202 that defines a longitudinal centerline 212 that extends therethrough, a lateral direction L, a forward end 214, and an aft end 216. Moreover, the aircraft 202 defines a mean line 268 extending between the forward end 214 and aft end 216 of the aircraft 202. As used herein, the "mean line" refers to a midpoint line extending along a length of the aircraft 202, not taking into account the appendages of the aircraft 202 (such as the wing 224).

Moreover, the aircraft 202 includes a fuselage 220, extending longitudinally from the forward end 214 of the aircraft 202 towards the aft end 216 of the aircraft 202, and a wing assembly 272. In an exemplary embodiment of the present disclosure, the wing assembly 272 includes a first primary wing 273 and a second primary wing 275. For example, the first primary wing 273 extends laterally outwardly with respect to the longitudinal centerline 212 from a first or starboard side 286 of the fuselage 220 and the second primary wing 275 extends laterally outwardly with respect to the longitudinal centerline 212 from a second or port side 284 of the fuselage 220. Each of the primary wings 273, 275 for the exemplary embodiment depicted may include one or more leading edge flaps 288 and one or more trailing edge flaps 290. The aircraft 202 further includes a vertical stabilizer having a rudder flap for yaw control, and a pair of horizontal stabilizers 296, each having an elevator flap 298 for pitch control. The fuselage 220 additionally includes an outer surface 299.

The exemplary aircraft 202 of FIG. 4 also includes a propulsion system. In an exemplary embodiment, the exemplary propulsion system includes a plurality of aircraft engines, at least one of which is mounted to each of the primary wings 273, 275. For example, the plurality of aircraft engines includes a first aircraft engine 291 mounted to the first primary wing 273 and a second aircraft engine 293 mounted to the second primary wing 275. In at least certain exemplary embodiments, the aircraft engines 291, 293 may be configured as turbofan jet engines suspended beneath the primary wings 273, 275 in an under-wing configuration. Alternatively, however, in other exemplary embodiments any other suitable aircraft engine configuration may be provided.

Referring now back also to FIGS. 2 and 3, it will be appreciated that the unducted turbofan engine 100 described above with respect to FIGS. 2 and 3 may be mounted to each of the primary wings 273, 275 of the aircraft 202 of FIG. 4. In such a manner, it will be appreciated that the unducted turbofan engine 100 may be included in the propulsion system of FIG. 4 as one of the first or second aircraft engines 291, 293 (unducted turbofan engine 100 not separately labeled in FIG. 4).

Referring still to FIGS. 2 and 3, for the embodiment depicted, the aircraft 202 includes the pylon fairing 228. The pylon fairing 228 is a mount extending between the wing 224 and the unducted turbofan engine 100. The pylon fairing 228 connects the unducted turbofan engine 100 to the wing 224. In particular, for the embodiment of FIG. 4, the aircraft 202 includes a pylon fairing 228 to connect the first aircraft engine 291, e.g., a first unducted turbofan engine, to the first primary wing 273 and includes another pylon fairing 228 to connect the second aircraft engine 293, e.g., a second unducted turbofan engine, to the second primary wing 275.

As previously discussed, the present disclosure is generally related to aerodynamically designed pylon fairings that enable improved performance, acoustics, and compatibility with the aircraft controllability. Open rotor or open fan installations uniquely have rotor or fan stream exhaust washing a pylon fairing that connects the engine to the aircraft. Traditional turbofans only have a freestream flow scrubbing the pylon fairing and such a flow does not have swirl. An open fan's exhaust scrubs the pylon fairing with a swirling flow of higher velocity than such a freestream flow. This results in a greater risk of higher drag and a loss of efficiency. The aerodynamically designed pylon fairings of the present disclosure improve performance in such conditions.

Figure 5:
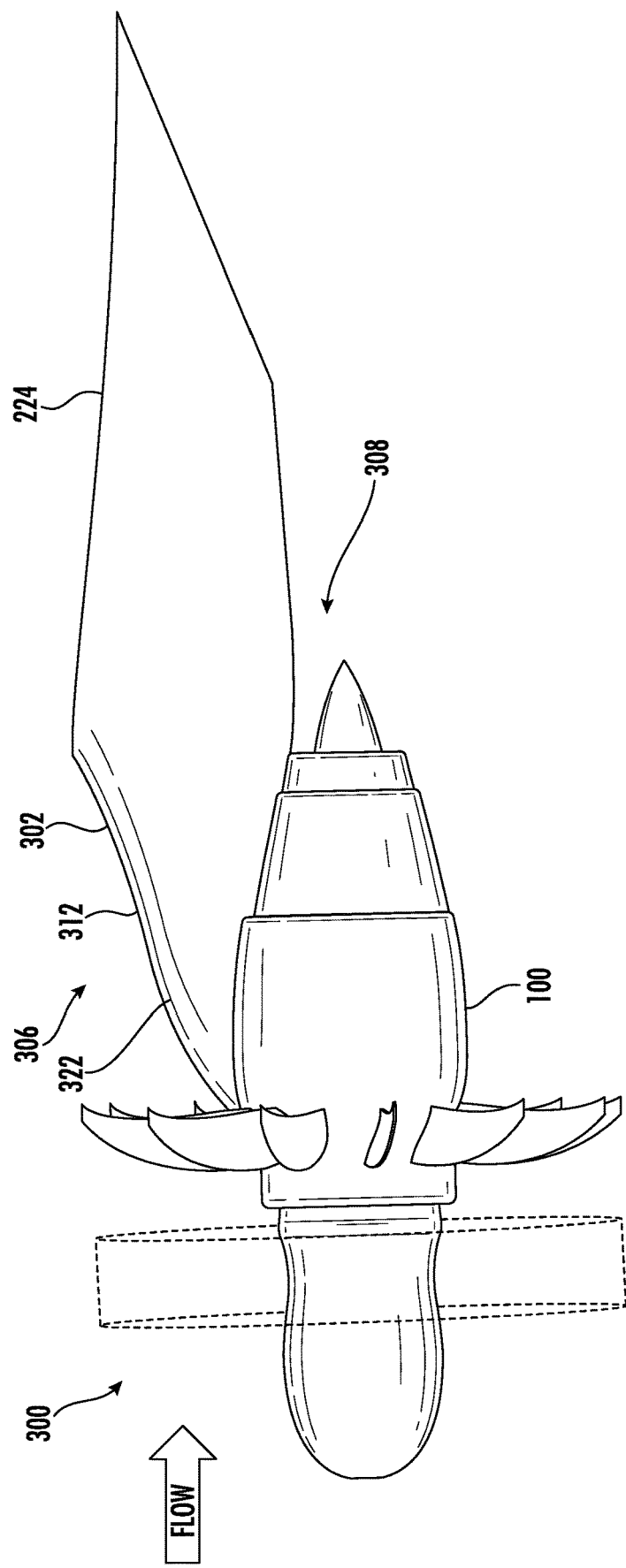
FIG. 5 is a side perspective view of an open rotor pylon system including a pylon fairing according to another exemplary embodiment of the present subject matter.
Figure 6:
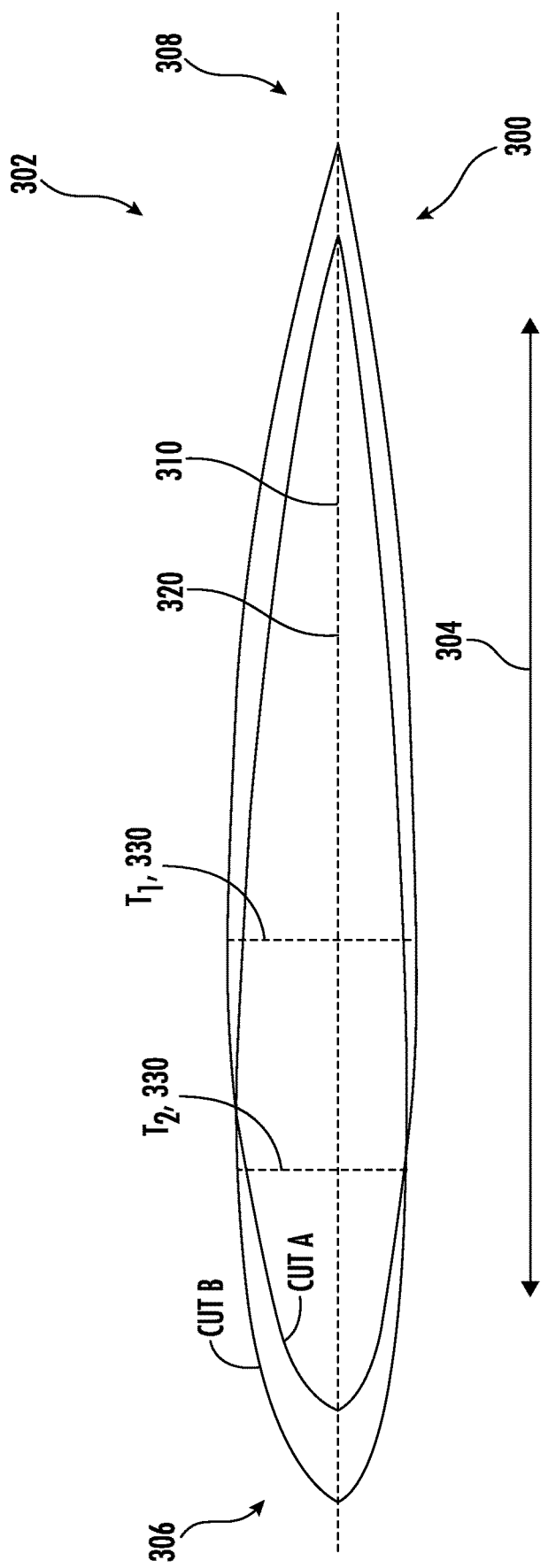
FIG. 6 is a cross-section view of a first chord (CUT A) of a pylon fairing at a first position, and a second chord (CUT B) of a pylon fairing at a second position, with the first chord and the second chord in an overlapping configuration according to another exemplary embodiment of the present subject matter.

Referring now generally to FIGS. 5 through 7, in exemplary embodiments of the present disclosure, an open rotor pylon system 300 including a pylon fairing 302 includes an improved thickness distribution along a lengthwise direction 304 of the pylon fairing 302 will now be described in detail below. It is contemplated that the aerodynamically designed pylon fairings of the present disclosure may be implemented on an underwing installation as shown in FIG. 5.

Referring now to FIG. 5, a side perspective view of the open rotor pylon system 300 including the pylon fairing 302 is provided. Referring also to FIG. 6, a cross-section view of a first chord 310 (CUT A) of the pylon fairing 302, e.g., at a first position 312, and a second chord 320 (CUT B) of the pylon fairing 302, e.g., at a second position 322, with the first chord 310 and the second chord 320 in an overlapping configuration is provided. Referring also to FIG. 7, a cross-section view of the first chord 310 (CUT A) of the pylon fairing 302, e.g., at a first position 312, and the second chord 320 (CUT B) of the pylon fairing 302, e.g., at a second position 322, with the first chord 310 and the second chord 320 shown separated is provided.

Referring to FIGS. 5-7, the pylon fairing 302 defines a lengthwise direction 304, a leading edge 306, a trailing edge 308, the first chord 310 (CUT A) extending from the leading edge 306 to the trailing edge 308 at the first position 312 along the lengthwise direction 304, and the second chord 320 (CUT B) extending from the leading edge 306 to the trailing edge 308 at the second position 322 along the lengthwise direction 304.

Advantageously, the pylon fairing 302 includes a first maximum thickness portion T1 at a first percentage of the first chord 310 and a second maximum thickness portion T2 at a second percentage of the second chord 320. The first percentage of the first maximum thickness portion T1 is different than the second percentage of the second maximum thickness portion T2.

For example, in certain embodiments, the first maximum thickness portion T1 is located between 30% and 60% of the first chord 310 from the leading edge 306. For example, in other certain embodiments, the first maximum thickness portion T1 is located between 35% and 60% of the first chord 310 from the leading edge 306. For example, in yet other certain embodiments, the first maximum thickness portion T1 is located between 40% and 60% of the first chord 310 from the leading edge 306.

For example, in certain embodiments, the second maximum thickness portion T2 is located between 10% and 40% of the second chord 320 from the leading edge 306. For example, in other certain embodiments, the second maximum thickness portion T2 is located between 15% and 40% of the second chord 320 from the leading edge 306. For example, in yet other certain embodiments, the second maximum thickness portion T2 is located between 20% and 40% of the second chord 320 from the leading edge 306.

In an exemplary embodiment of the present disclosure, the first maximum thickness portion T1 is located a first distance D1 from the leading edge 306 and the second maximum thickness portion T2 is located a second distance D2 from the leading edge 306. Furthermore, the second distance D2 is less than the first distance D1.

In another exemplary embodiment of the present disclosure, the pylon fairing 302 includes a maximum thickness portion 330 along the lengthwise direction 304 of the pylon fairing 302 located between 10% and 60% of a chord of the pylon fairing 302. In this manner, the maximum thickness portion 330 of the present disclosure allows for the control of the acceleration and/or deceleration of the open rotor pylon system 300. For example, the maximum thickness portion 330 of the present disclosure allows for the control of the acceleration and/or deceleration of a prop wash within the constraints of the nacelle blockage, pylon blockage, and/or wing blockage to mitigate the shock losses that may occur due to supersonic flow at a high speed cruise condition. Furthermore, a variable maximum thickness portion 330 of the present disclosure also allows for balancing both the transonic flow around the pylon fairing 302 with the internal packaging constraints of an engine system mounted inside the pylon fairing 302. By controlling the location of the maximum thickness portion 330 of the pylon fairing 302 as described herein, the present disclosure allows for control of the flow area from upstream to downstream of the pylon fairing 302.

In other certain embodiments, the pylon fairing 302 includes a maximum thickness portion 330 along the lengthwise direction 304 of the pylon fairing 302 located between 20% and 50% of a chord of the pylon fairing 302. In yet other certain embodiments, the pylon fairing 302 includes a maximum thickness portion 330 along the lengthwise direction 304 of the pylon fairing 302 located between 30% and 40% of a chord of the pylon fairing 302.

In one exemplary embodiment, the maximum thickness portion 330 is closer to the leading edge 306 proximate the unducted turbofan engine 100. In other exemplary embodiments, the maximum thickness portion 330 is closer to the trailing edge 308.

Referring now generally to FIGS. 8 through 10B, in exemplary embodiments of the present disclosure, an open rotor pylon system 400 including a pylon fairing 402 that includes a first suction side 420 and a first pressure side 430 will now be described in detail below.

Figure 9A:
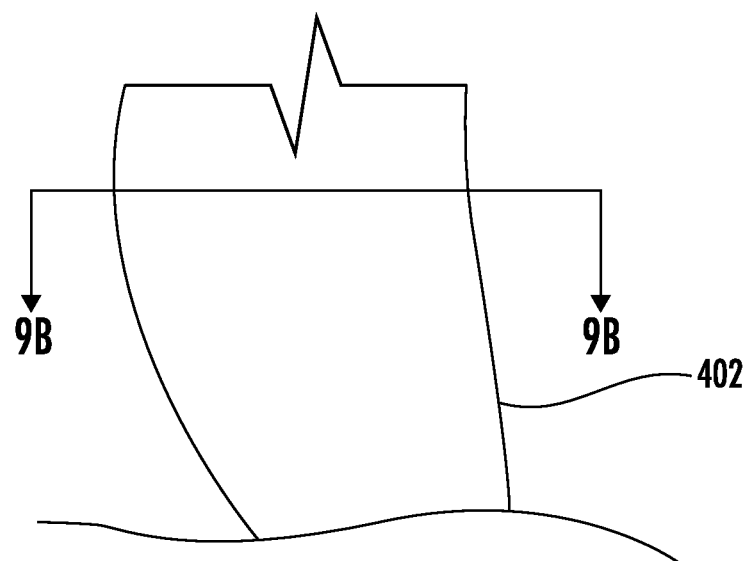
FIG. 9A is a side elevation view of a pylon fairing according to another exemplary embodiment of the present subject matter.
Figure 9B:
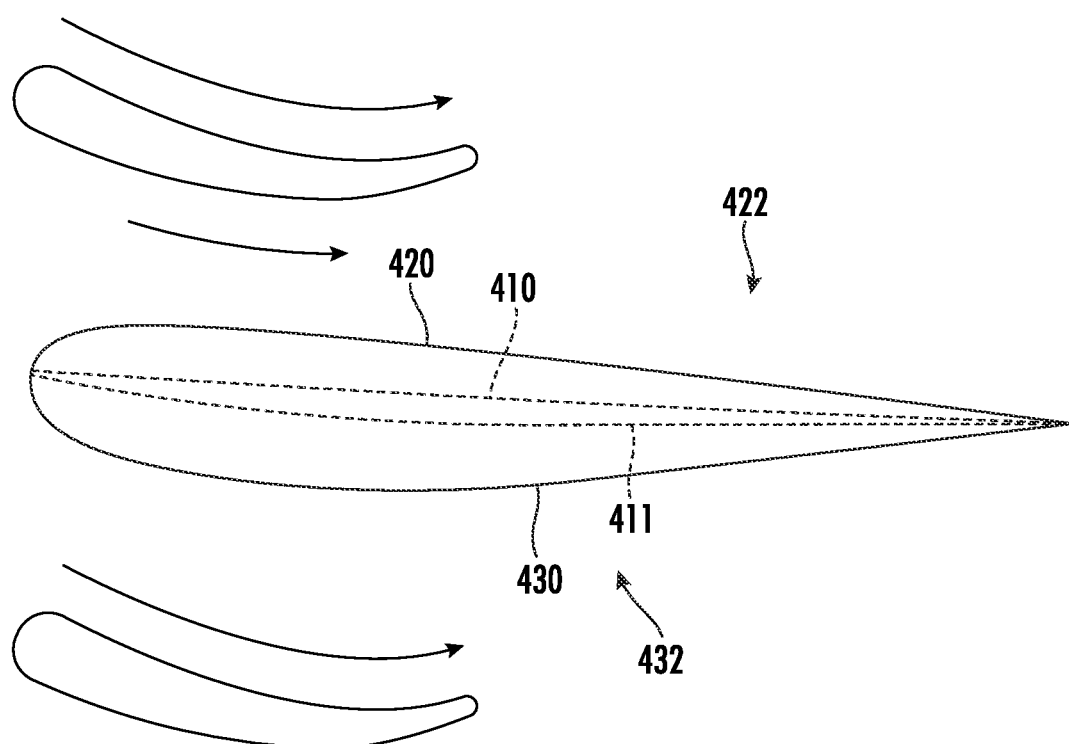
FIG. 9B is a cross-section view of the pylon fairing of FIG. 9A, taken along line 9B-9B of FIG. 9A, according to another exemplary embodiment of the present subject matter.
Figure 10A:
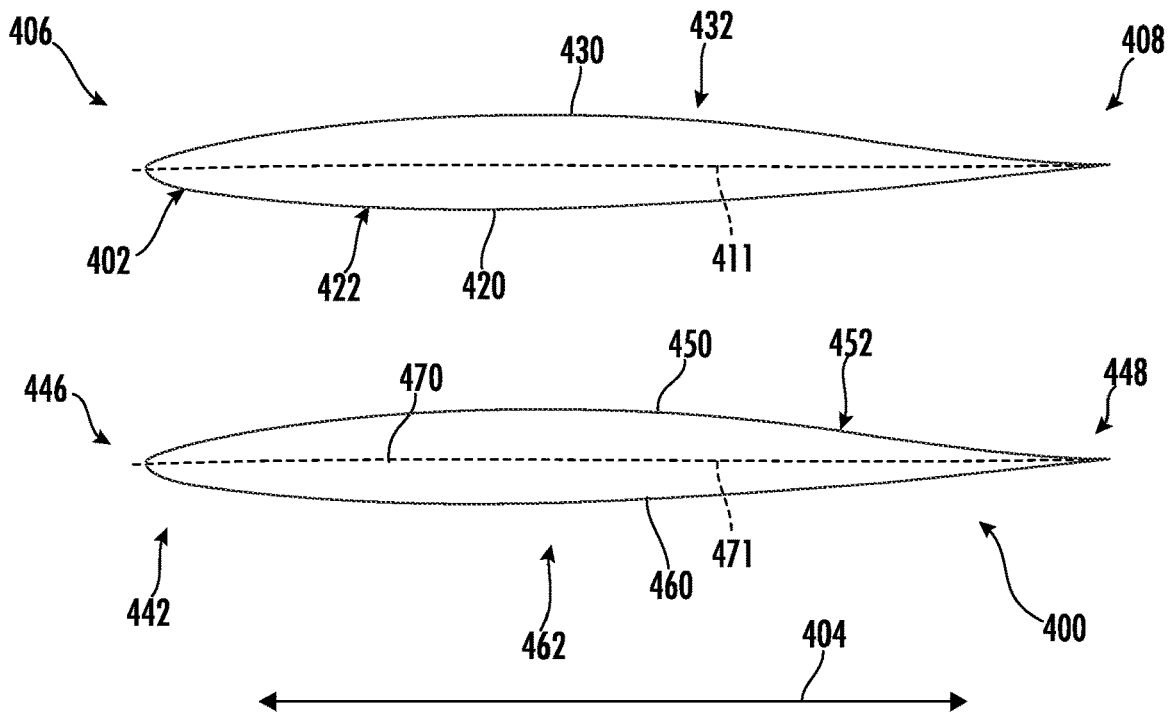
FIG. 10A is a cross-section view of a first pylon fairing and a cross-section view of a second pylon fairing according to another exemplary embodiment of the present subject matter.
Figure 10B:
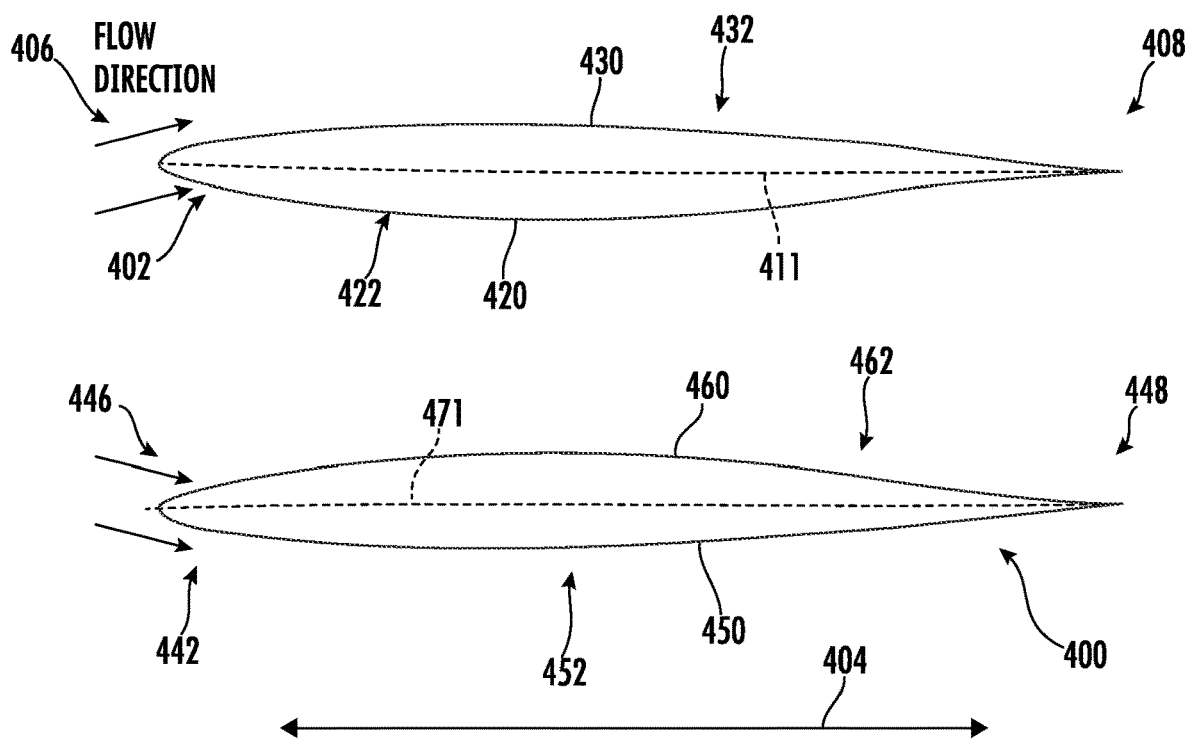
FIG. 10B is a cross-section view of a first pylon fairing and a cross-section view of a second pylon fairing according to yet another exemplary embodiment of the present subject matter.

Referring now to FIG. 8, a perspective view of an open rotor pylon system 400 including a pylon fairing 402 is provided. Referring also to FIG. 9A, a side elevation view of the pylon fairing 402 is provided. Referring also to FIG. 9B, a cross-section view of the pylon fairing 402, taken along line 9B-9B of FIG. 9A, is provided. Referring also to FIGS. 10A and 10B, cross-section views of the first pylon fairing or pylon fairing 402 and a cross-section view of a second pylon fairing 442 according to exemplary embodiments are provided. The first pylon fairing 402 may be used to connect a first aircraft engine to a first wing of an aircraft and the second pylon fairing 442 may be used to connect a second aircraft engine to a second wing of an aircraft.

Referring to FIGS. 8-10B, the pylon fairing 402 defines a lengthwise direction 404, a leading edge 406, a trailing edge 408, a chord 410 and a camber 411 extending from the leading edge 406 to the trailing edge 408, the first pressure side 420, and the first suction side 430. Advantageously, the first pressure side 420 of the pylon fairing 402 defines a first shape 432, and the first suction side 430 of the pylon fairing 402 defines a second shape 422 different than the first shape 432. In this manner, the difference in shape and/or curvature of the first pressure side 420 and the first suction side 430 of the pylon fairing 402 is configured to maximize de-swirl capability.

Furthermore, an outlet guide vane is designed to limit the swirl imparted on a prop stream flow by the rotor. However, the outlet guide vane is not perfectly efficient and some amount of residual swirl downstream of the outlet guide vane is possible when the engine is installed on the aircraft. The pylon fairing 402 of the present disclosure is designed to tolerate some amount of residual swirl and may also act as a crude outlet guide vane to remove some swirl that is not removed by the outlet guide vanes. The prop and outlet guide vane exit swirl profiles vary with radius. Accordingly, the shape of the pylon fairing 402 (e.g., section cuts) will also vary with radius. As such, the pylon fairing 402 of the present disclosure, designed to act like a crude outlet guide vane, is configured to have suction and pressure sides defining different shapes as described herein. In other words, the swirl changes from hub to tip. Accordingly, the first pressure side 420 and first suction side 430 of the pylon fairing 402 changes hub to tip to accommodate the changing swirl and mitigate drag.

In exemplary embodiments of the present disclosure, the geometries of the first pressure side 420 of the pylon fairing 402 defining the first shape 432 and the first suction side 430 of the pylon fairing 402 defining the second shape 422 different than the first shape 432 are configured such that the maximum thickness value and location of each is designed for minimum drag by controlling the strength and location of the likely shock. The degree of incoming swirl expected by each side of the first pressure side 420 and the first suction side 430 will also influence a bluntness. Each of the first pressure side 420 and the first suction side 430 of the pylon fairing 402 is a non-symmetric airfoil having distinctive lift and drag characteristics that depend on incidence angle (e.g., swirl angle) and oncoming velocity (e.g., outlet guide vane exit velocity which varies radially).

Referring to FIG. 10A, in an exemplary configuration, the second pylon fairing 442 has a greater max thickness to chord ratio than the pylon fairing 402 which enables a more efficient pylon fairing design. Furthermore, the second pylon fairing 442 defines a pylon waterline section at a different spanwise location between the nacelle and the wing.

Referring to FIG. 10B, in another exemplary configuration, the second pylon fairing 442 defines a camber 471 opposite the camber 411 of the pylon fairing 402. In this manner, the second pylon fairing 442 is designed for a different outlet guide vane exit camber orientation.

In an exemplary embodiment of the present disclosure, the geometry of the first shape 432 of the first suction side 430 changes along a spanwise direction of the pylon fairing 402. Furthermore, in an exemplary embodiment of the present disclosure, the geometry of the second shape 422 of the first pressure side 420 changes along a spanwise direction of the pylon fairing 402. The views depicted in FIGS. 10A and 10B are each taken from a common spanwise position (e.g., as a percent of total span).

In an exemplary embodiment of the present disclosure, the first shape 432 and the second shape 422 are different at the same location along the lengthwise direction 404 of the pylon fairing 402.

Referring now also to FIG. 4, as described above, the first primary wing 273 extends laterally outwardly with respect to the longitudinal centerline 212 from the first or starboard side 286 of the fuselage 220 and the second primary wing 275 extends laterally outwardly with respect to the longitudinal centerline 212 from the second or port side 284 of the fuselage 220. In an exemplary embodiment of the present disclosure, the open rotor pylon system 400 of the present disclosure includes the pylon fairing 402, i.e., a first pylon fairing 402, that connects a first aircraft engine 291 to the first wing 273 and a second pylon fairing 442 that connects a second aircraft engine 293 to the second primary wing 275. In such a manner, it will be appreciated that although the first and second pylon fairings 402, 442 are positioned next to each other in FIGS. 10A, 10B for convenience, in practice the first and second pylon fairings 402, 442 may be spaced from one another, such as positioned on opposite sides of a fuselage of an aircraft.

Referring again to FIGS. 10A and 10B, the second pylon fairing 442 also defines a lengthwise direction 404 and includes a leading edge 446, a trailing edge 448, a chord (not labeled) extending from the leading edge 446 to the trailing edge 448, a second pressure side 460, and a second suction side 450. In exemplary embodiments, the second pressure side 460 of the second pylon fairing 442 defining a third shape 452, and the second suction side 450 of the second pylon fairing 442 defining a fourth shape 462 different than the third shape 452.

In certain embodiments, the third shape 452 of the second pressure side 460 of the second pylon fairing 442 and the first shape 432 of the first suction side 430 of the first pylon fairing 402 are the same. In other certain embodiments, the third shape 452 of the second pressure side 460 of the second pylon fairing 442 and the first shape 432 of the first suction side 430 of the first pylon fairing 402 are different.

In other certain embodiments, the fourth shape 462 of the second suction side 460 of the second pylon fairing 442 and the second shape 422 of the first pressure side 430 of the first pylon fairing 402 are the same. In other certain embodiments, the fourth shape 462 of the second suction side 460 of the second pylon fairing 442 and the second shape 422 of the first pressure side 430 of the first pylon fairing 402 are different.

Figure 11:
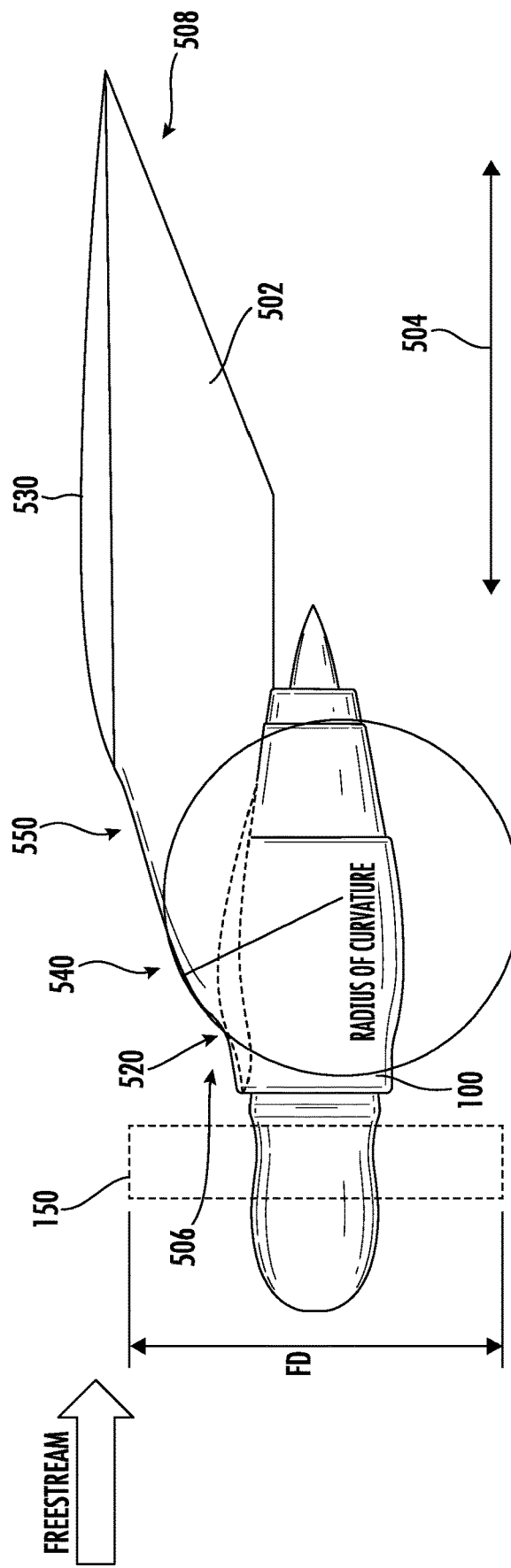
FIG. 11 is a perspective view of an open rotor pylon system including a pylon fairing according to another exemplary embodiment of the present subject matter.

Referring now to FIG. 11, in another exemplary embodiment of the present disclosure, illustrated is a perspective view of an open rotor pylon system 500 including a pylon fairing 502 that defines a lengthwise direction 504, a leading edge 506, a trailing edge 508, and includes a first inflection point 520 along the leading edge 506 will now be described in detail below.

As described above, the unducted turbofan engine 100 includes an unducted fan section 150 (also shown in FIG. 1). The unducted fan section 150 defines a fan diameter FD. Advantageously, in an exemplary embodiment, the first inflection point 520 defines a first radius of curvature that is less than 5 times the fan diameter FD and greater than 0.1 times the fan diameter FD. In this manner, additional volume is provided in the pylon fairing 502 and further aerodynamic benefits are realized. For example, the pylon fairing 502 of the present disclosure provides a greater premium to the internal volume of the pylon fairing 502. Furthermore, the first inflection point 520 of the pylon fairing 502 is configured to blend the pylon fairing 502 into the nacelle and the outlet guide vane hub flow path.

In such a manner, the pylon fairing 502 having the first inflection point 520 along the leading edge 506 defines a generally duckbill shape. Advantageously, the duckbill shape of the present disclosure creates additional internal volume for the pylon fairing 502. Also, such a duckbill shape provides a long and thin shape that reduces the drag associated with supersonic flow at cruise conditions. Furthermore, the duckbill shape allows a longer chord and allows the pylon fairing 502 to begin controlling the flow through a gully portion earlier.

In an exemplary embodiment, the first inflection point 520 of the pylon fairing 502 is located at a position closer to the unducted turbofan engine 100 than the wing assembly 224 (FIG. 2).

In the exemplary embodiment, the pylon fairing 502 includes a second inflection point 540 along the leading edge 506 of the pylon fairing 502 downstream of the first inflection point 520. The second inflection point 540 defines a second radius of curvature that is less than 3 times the fan diameter and greater than 0.1 times the fan diameter. Advantageously, the second inflection point 540 is configured to provide better control of a flow of air over the leading edge 506 of the pylon fairing 502 into the wing. The shape provided by the second inflection point 540 of the pylon fairing 502 minimizes interference drag and minimizes the impact to wing lift.

In the exemplary embodiment, the pylon fairing 502 includes a third inflection point 550 along the leading edge 506 of the pylon fairing 502 downstream of the first inflection point 520 and the second inflection point 540. The third inflection point 550 defines a third radius of curvature that is less than 3 times the fan diameter and greater than 0.1 times the fan diameter. Advantageously, the second inflection point 540 and the third inflection point 550 of the present disclosure are configured to define the shape of the pylon fairing 502 that is exposed to a majority of the prop wash. Furthermore, the second inflection point 540 and the third inflection point 550 of the present disclosure negotiate outlet guide vane exit flow around the pylon fairing 502 and into the wing.

In the exemplary embodiment, the pylon fairing 502 also includes a cantilevered stator vane 530. It is contemplated that the cantilevered stator vane 530 is stationary.

Referring now generally to FIGS. 12 and 13, in another exemplary embodiment of the present disclosure, an open rotor pylon system 600 including a pylon fairing 602 that includes a forwardmost point 620 that covers a portion of the unducted turbofan engine 100 will now be described in detail below.

Referring now to FIG. 12, a side elevation view of the open rotor pylon system 600 including the pylon fairing 602 is provided. Referring also to FIG. 13, a schematic view of the open rotor pylon system 600 including the pylon fairing 602 is provided.

Referring to FIGS. 12 and 13, the pylon fairing 602 defines a lengthwise direction 604, a leading edge 606, a trailing edge 608, a forwardmost point 620, and a rearmost point 622.

The unducted turbofan engine 100 also includes an outlet guide vane 670, a forward compressor frame 680, a core nozzle exit 690, and an inlet lip 692. The outlet guide vane 670 includes a leading edge 672 and a trailing edge 674. The forward compressor frame 680 includes a mount 682.

Advantageously, in an exemplary embodiment, the forwardmost point 620 of the pylon fairing 602 is disposed upstream of the trailing edge 674 of the outlet guide vane 670. In this manner, the forwardmost point 620 of the pylon fairing 602 is configured to enable drag reduction.

Advantageously, in another exemplary embodiment, the forwardmost point 620 of the pylon fairing 602 is disposed upstream of the mount 682 of the forward compressor frame 680, i.e., the forwardmost point 620 of the pylon fairing 602 covers the mount 682 of the forward compressor frame 680. In this manner, the forwardmost point 620 of the pylon fairing 602 is configured to enable drag reduction and provide structural protection to the mount 682 of the forward compressor frame 680.

Referring to FIG. 12, in an exemplary embodiment of the present disclosure, the forwardmost point 620 of the pylon fairing 602 extends to the inlet lip 692 of the unducted turbofan engine 100 and the rearmost point 622 extends to the core nozzle exit 690 of the unducted turbofan engine 100.

Figure 14:
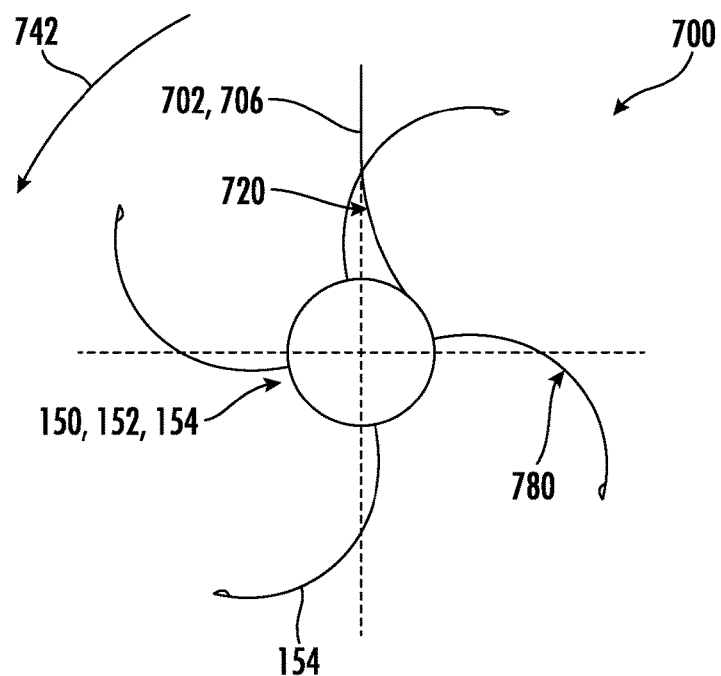
FIG. 14 is a schematic view of an open rotor pylon system including a pylon fairing according to another exemplary embodiment of the present subject matter.
Figure 15:
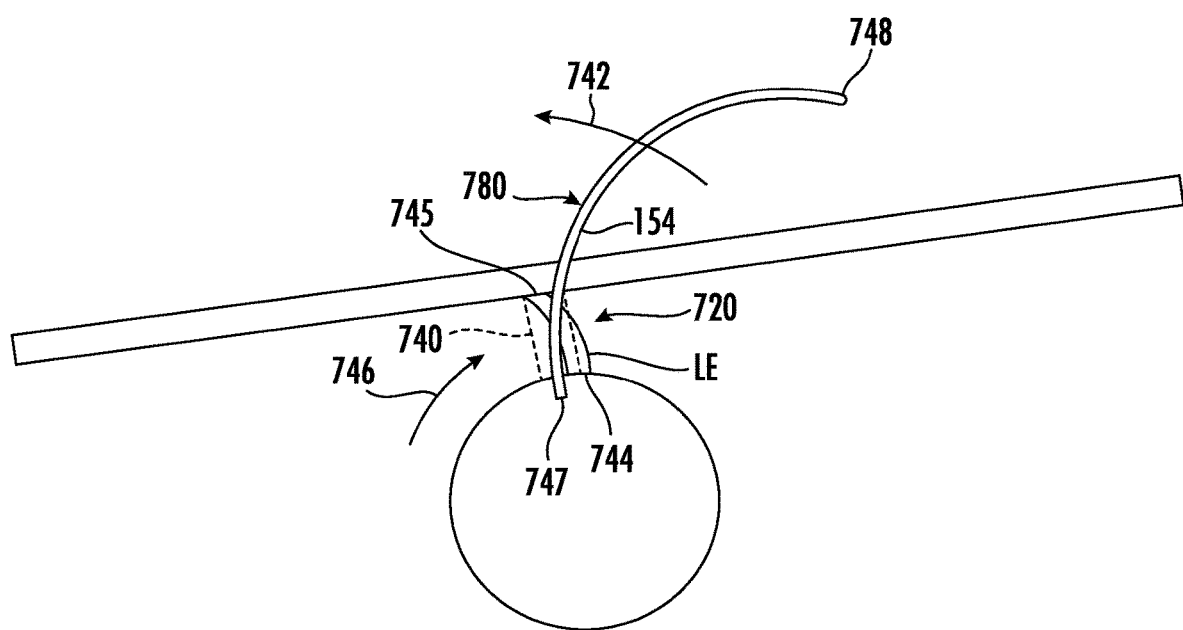
FIG. 15 is another schematic view of an open rotor pylon system including a pylon fairing according to another exemplary embodiment of the present subject matter.

Referring now generally to FIGS. 14 and 15, in another exemplary embodiment of the present disclosure, an open rotor pylon system 700 including a pylon fairing 702 that defines a pylon fairing dihedral 720 will now be described in detail below. It will be appreciated that the dihedral 720 depicted schematically in FIGS. 14 and 15 is a schematic projection a leading edge 706 of the pylon fairing 702 in a cross-stream view.

Referring now to FIG. 14, a first schematic view of the open rotor pylon system 700 including the pylon fairing 702 is provided. Referring also to FIG. 15, a second schematic view of the open rotor pylon system 700 including the pylon fairing 702 is provided.

Referring to FIGS. 14 and 15, the pylon fairing 702 defines the leading edge 706 and the pylon fairing dihedral 720. In an exemplary embodiment, the pylon fairing dihedral 720 is at the leading edge 706 of the pylon fairing 702.

In an exemplary embodiment, the pylon fairing dihedral 720 extends a length of the leading edge 706 of the pylon fairing 702. In another exemplary embodiment of the present disclosure, the pylon fairing dihedral 720 extends an entirety of the length of the leading edge 706 of the pylon fairing 702. In an exemplary embodiment, the pylon fairing 702 includes a pylon fairing body 740 downstream of the leading edge 706. In an exemplary embodiment, the pylon fairing body 740 downstream of the leading edge 706 is radially aligned, i.e., the pylon fairing body 740 does not include the pylon fairing dihedral 720.

As described above, the unducted turbofan engine 100 (FIG. 1) includes an unducted fan section 150 (also shown in FIG. 1) having an unducted fan 152 (also shown in FIG. 1) that includes an array of fan blades 154, with each fan blade 154 defining a fan trailing edge lean 780 or trailing edge lean profile. During operation, a rotation of the fan blades 154 generates a fan wake having a sheared profile with a lean relative to the direction of rotation.

Advantageously, in an exemplary embodiment, the pylon fairing 702 defines a pylon fairing dihedral 720 that is in a direction opposite the fan trailing edge lean 780. In this manner, the pylon fairing dihedral 720 is configured to increase a phasing of the gust interaction due to the sheared fan wakes of the unducted fan 152 impinging on the pylon leading edge.

In particular, it will be appreciated that during operation the array of fan blades of the unducted fan 152 (FIG. 1) generate a wake that travels downstream from the fan 152 due to a local pressurization of an airflow through the array of fan blades 154. In order to offset an arrival of the wake from an individual fan blade 154 at the pylon fairing 702, the pylon fairing 702 defines the pylon fairing dihedral 720. Notably, the fan blade 154 defines a dihedral, which provides an initial offset of the wake arrival at the pylon fairing 702. By providing a dihedral of the pylon fairing 702 opposite the direction of the sheared fan wakes 154, further time delay may be provided to the wake interaction with the pylon, thereby reducing the interaction noise emanating from the pylon leading edge. Such a configuration may reduce a noise generated during operation of the unducted turbofan engine 100 (FIG. 1).

Furthermore, referring still to FIGS. 14 and 15, the unducted fan 152 includes a fan blade 154 that rotates in a first direction 742. In an exemplary embodiment, the pylon fairing dihedral 720 is in the first direction 742 from a base 744 to a top 745 of the pylon fairing 702, and the fan trailing edge lean 780 is in a second direction 746 opposite the first direction 742 from a root 747 to a tip 748 of the fan blade 154.

In another exemplary embodiment, a portion of the pylon fairing 702 that is downstream of the leading edge 706 is radially still, i.e., that does not include the pylon fairing dihedral 720.

Referring now generally to FIGS. 16-20, in another exemplary embodiment of the present disclosure, an open rotor pylon system 800 including a pylon fairing 802 having a leading edge section 820 that defines a leading edge camber 830 that varies will now be described in detail below.

Figure 16:
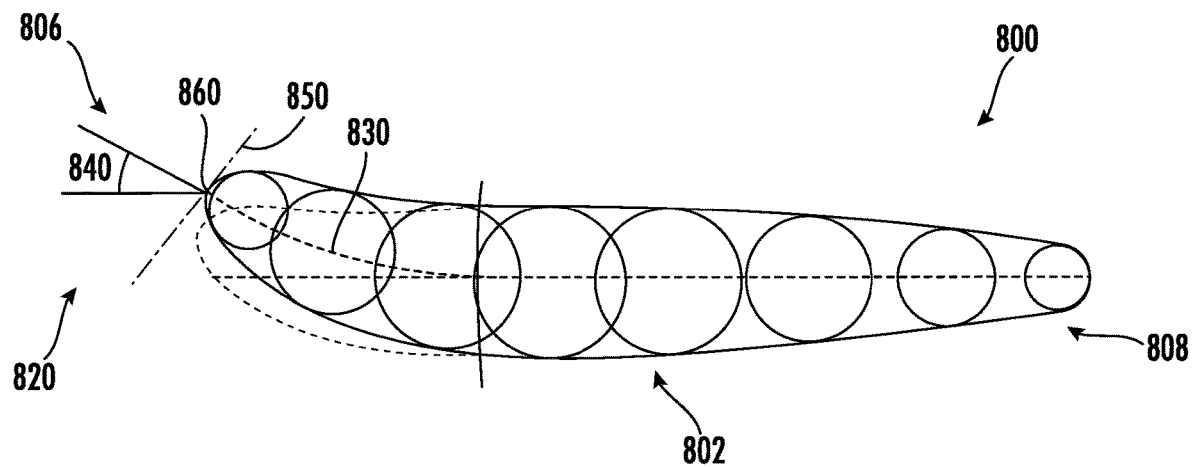
FIG. 16 is a cross-section view of an open rotor pylon system including a pylon fairing according to another exemplary embodiment of the present subject matter.
Figure 17:
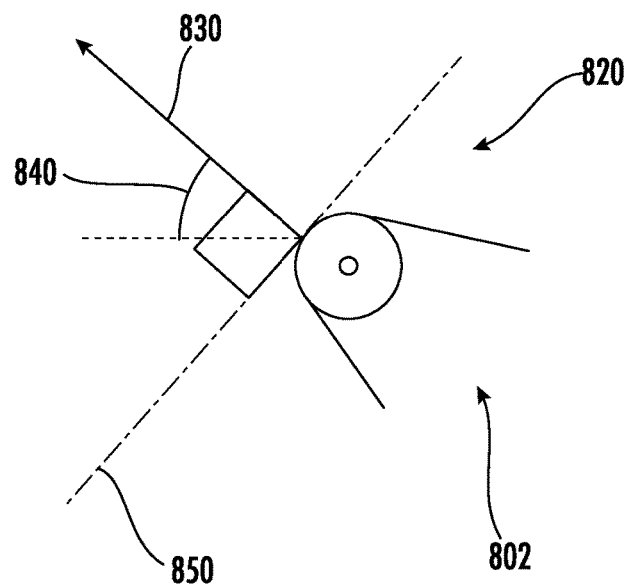
FIG. 17 is a schematic view of a leading edge section of a pylon fairing according to another exemplary embodiment of the present subject matter.
Figure 18:
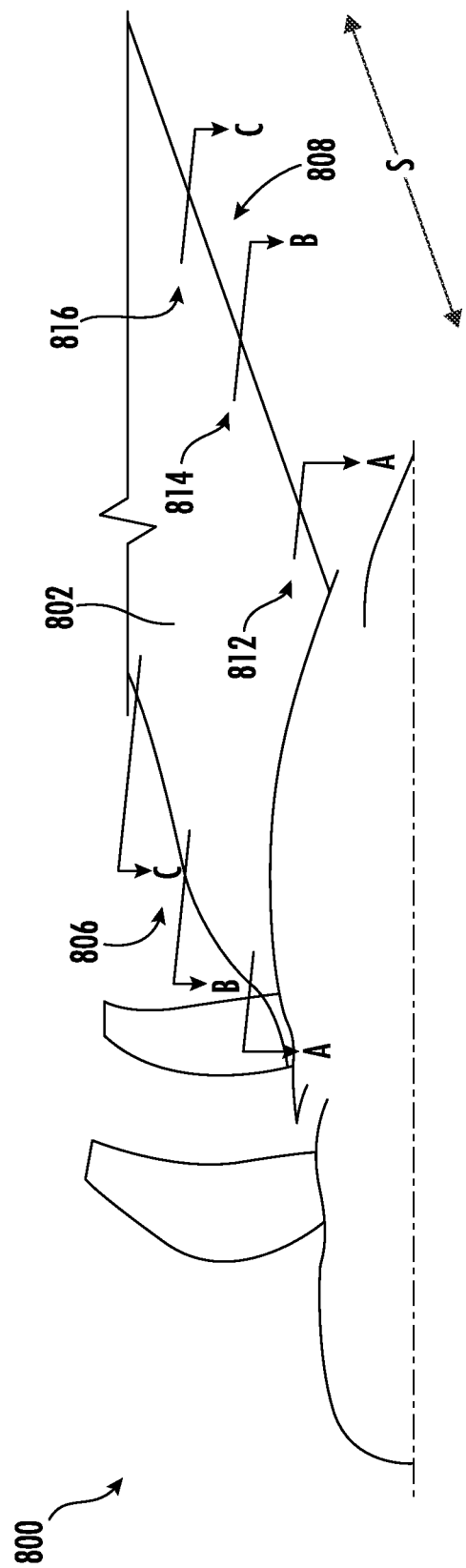
FIG. 18 is a side perspective view of an open rotor pylon system including a pylon fairing according to another exemplary embodiment of the present subject matter.
Figure 19A:
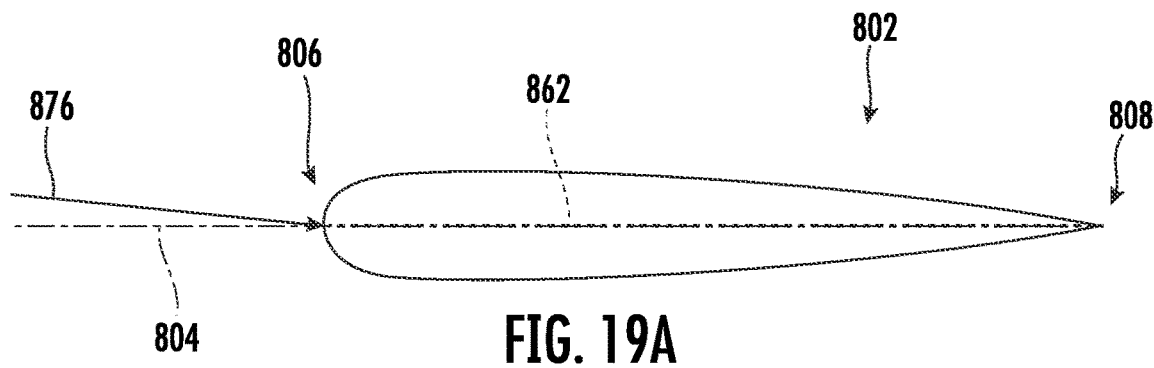
FIG. 19A is a cross-sectional view taken along line A-A of FIG. 18 of a first portion of a pylon fairing at a first position according to another exemplary embodiment of the present subject matter.
Figure 19B:
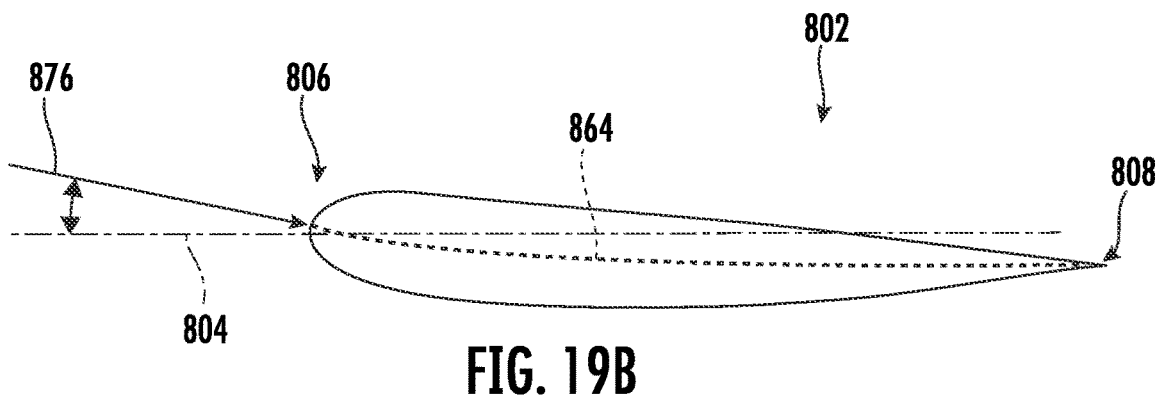
FIG. 19B is a cross-sectional view taken along line B-B of FIG. 18 of a second portion of a pylon fairing at a second position according to another exemplary embodiment of the present subject matter.
Figure 19C:
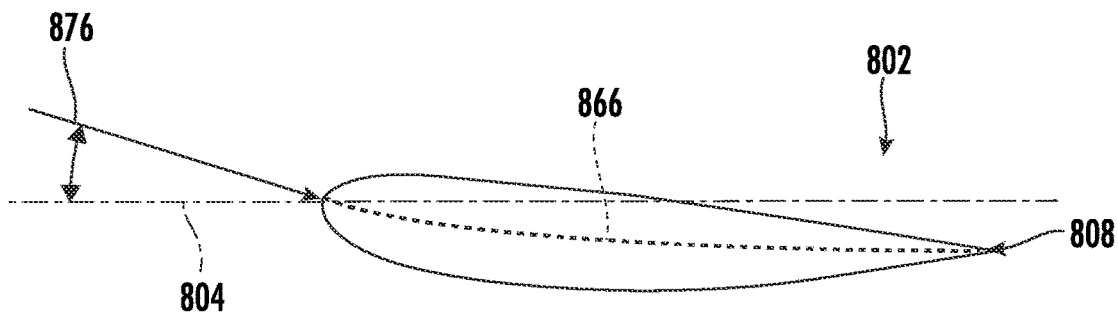
FIG. 19C is a cross-sectional view taken along line C-C of FIG. 18 of a third portion of a pylon fairing at a third position according to another exemplary embodiment of the present subject matter.
Figure 20:
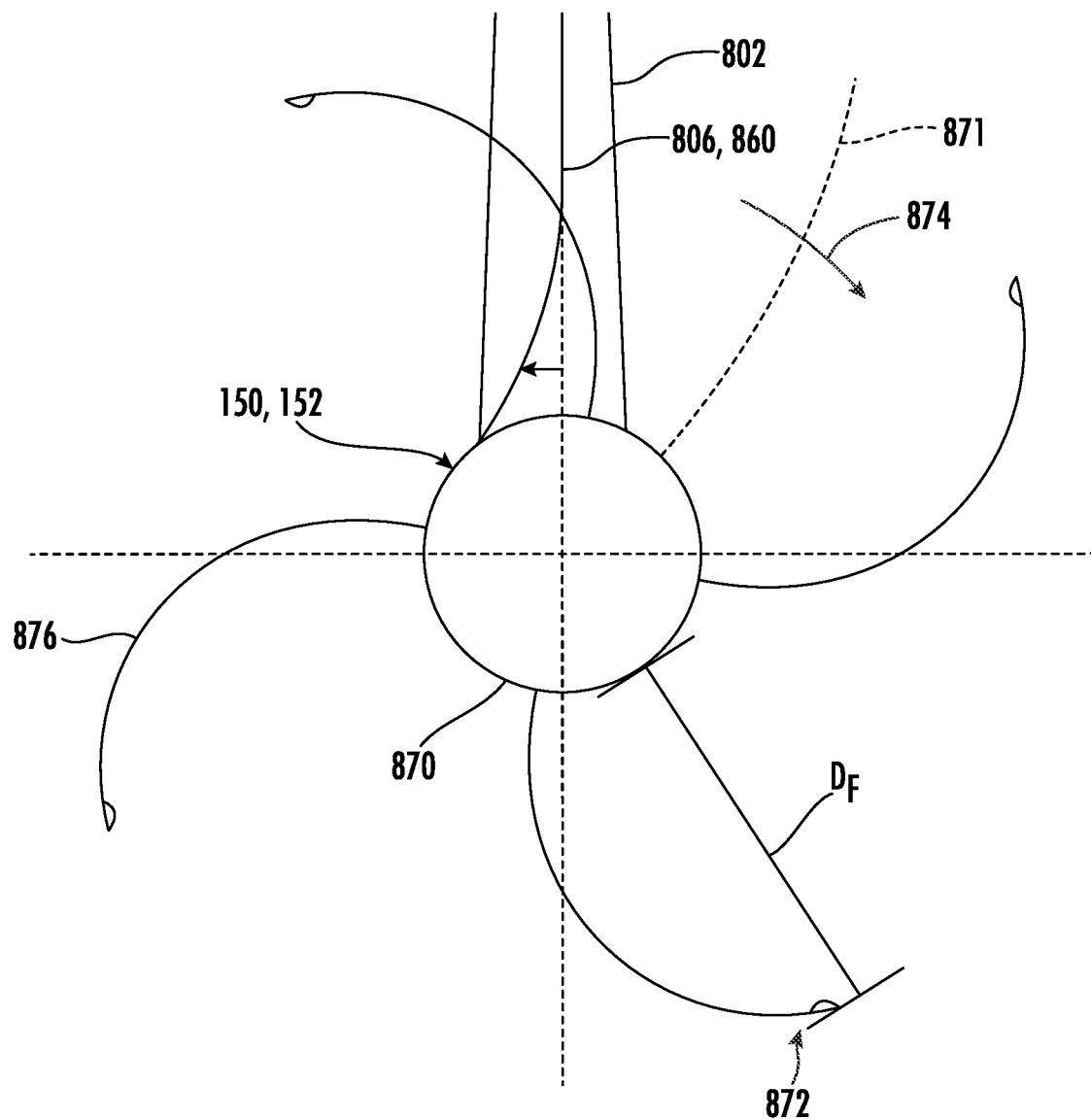
FIG. 20 is another schematic view of an open rotor pylon system including a pylon fairing according to another exemplary embodiment of the present subject matter.

Referring now to FIG. 16, a cross-section view of the open rotor pylon system 800 including the pylon fairing 802 is provided. Referring also to FIG. 17, a first schematic view of the leading edge section 820 of the pylon fairing 802 is provided. Referring also to FIG. 18, a side perspective view of the open rotor pylon system 800 including the pylon fairing 802 is provided. Referring also to FIG. 19A, a cross-sectional view taken along line A-A of FIG. 18 of a first portion of the pylon fairing 802, e.g., at a first position 812 along a spanwise direction S of the pylon fairing 802 is provided. Referring also to FIG. 19B, a cross-sectional view taken along line B-B of FIG. 18 of a second portion of the pylon fairing 802, e.g., at a second position 814 along the spanwise direction S of the pylon fairing 802 is provided. Referring also to FIG. 19C, a cross-sectional view taken along line C-C of FIG. 18 of a third portion of the pylon fairing 802, e.g., at a third position 816 along the spanwise direction S of the pylon fairing 802 is provided. Referring also to FIG. 20, a second schematic view of an open rotor pylon system 800 including a pylon fairing 802 is provided.

Referring to FIGS. 16-20, the pylon fairing 802 defines a lengthwise direction 804, a leading edge 806, a trailing edge 808, and the leading edge section 820 at the leading edge 806. Advantageously, the leading edge section 820 defines the leading edge camber 830 that varies along the lengthwise direction 804 of the pylon fairing 802.

In an exemplary embodiment, the leading edge section 820 also defines a leading edge angle 840 that is defined as an angle between the leading edge camber 830 and the axial direction A (see FIG. 1). The pierce point 860 is the point of intersection between the leading edge camber 830 (or camberline, also referred to as the mean camber line) and the airfoil surface of the pylon fairing 802.

In exemplary embodiments, it is contemplated that the leading edge camber angle 840 is between approximately 5 degrees and approximately 60 degrees. In other exemplary embodiments, the leading edge angle 840 is between approximately 10 degrees and approximately 50 degrees. In further exemplary embodiments, the leading edge angle 840 is between approximately 15 degrees and approximately 45 degrees.

As described above, the unducted turbofan engine 100 (FIG. 1) includes an unducted fan section 150 (also shown in FIG. 1) having an unducted fan 152 (FIG. 1) that includes an array of fan blades that generate wakes 876 (FIG. 1). Referring to FIG. 20, a single trailing edge 871 of an unducted fan blade is depicted in phantom, having a lean profile relative to a direction of rotation 874 of the unducted fan blade. It will be appreciated that during operation of the unducted fan 152, the fan blades generate fan wakes 876 extend a distance DF outward from an engine hub 870 to a fan tip vortex 872. As will be appreciated, the fan wakes 876 have a sheared profile, which develops as the fan wakes 876 move from the unducted fan 152 towards the pylon fairing 802.

In an exemplary embodiment, the leading edge camber 830 decreases from proximate the engine hub 870 to radially outward distances from the hub toward a fan blade tip 876. In another exemplary embodiment, the leading edge camber 830 is a minimum proximate the engine hub 870 relative to the fan blade tip 876.

Inclusion of the leading edge camber 830 having the variance depicted may allow for an increase in a phasing or rate of time of the fan wake 876 interactions with the pylon fairing leading edge. Such may reduce a noise generated, reduce stress on the parts, provide increases in efficiency, or a combination thereof.

Referring to FIGS. 19A-19C, the pylon fairing 802 defines a lengthwise direction 804, a spanwise direction S (see FIG. 18), a leading edge 806, a trailing edge 808, a first mean camber line 862 (CUT A-A) extending from the leading edge 806 to the trailing edge 808 at the first position 812 along the spanwise direction S; a second mean camber line 864 (CUT B-B) extending from the leading edge 806 to the trailing edge 808 at a second position 814 along the spanwise direction S; and a third mean camber line 866 (CUT C-C) extending from the leading edge 806 to the trailing edge 808 at a third position 816 along the spanwise direction S. Each of FIGS. 19A-19C shown an incoming fan wake 876, which are approaching at the directions shown relative to the lengthwise direction 804 (which may be parallel to a forward direction of the aircraft).

In the embodiment shown, the fan wake 876 at the position in FIG. 19A represents a relatively low swirl relative to the lengthwise direction (e.g., less than 5 degrees). The fan wake 876 at the position in FIG. 19B represents a higher swirl than shown at the position in FIG. 19A relative to the lengthwise direction (e.g., between 5 and 15 degrees). The fan wake 876 at the position in FIG. 19C represents a higher swirl than shown at the positions in FIG. 19A, 19B relative to the lengthwise direction (e.g., greater than 15 degrees). The differences in the mean camber lines, and more specifically in the leading edge cambers, at these different locations may allow for the pylon fairing to better receive the fan wake 876 during operation, e.g., with less noise and higher efficiency.

Figure 21:
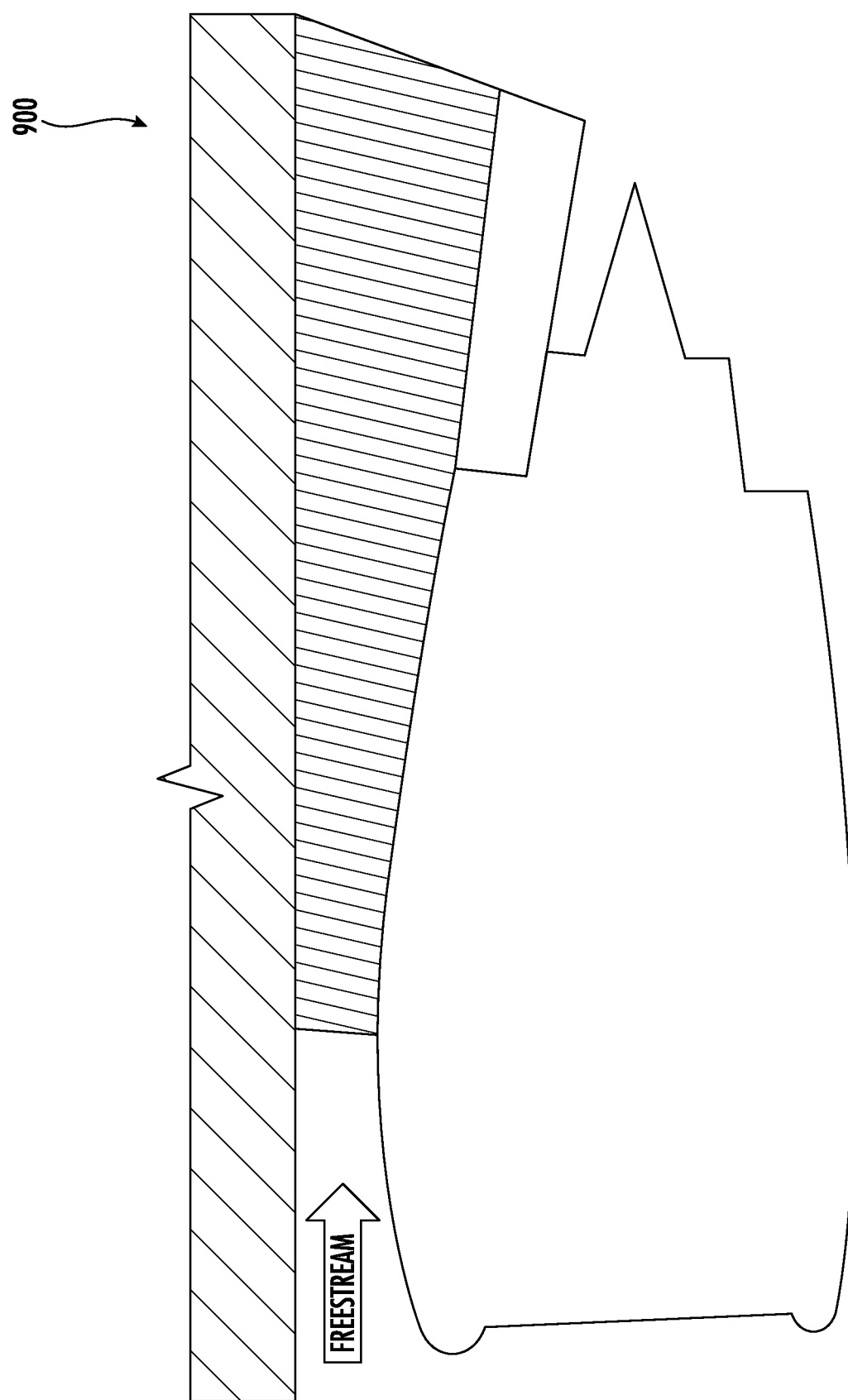
FIG. 21 is a schematic view of an engine having an aft fuselage installation according to another exemplary embodiment of the present subject matter.

It is contemplated that the aerodynamically designed pylon fairings of the present disclosure may also be implemented on aft fuselage installations 900 of an engine as shown in FIG. 21.

Further aspects of the disclosure are provided by the subject matter of the following clauses:

An aircraft defining a longitudinal centerline and extending between a forward end and an aft end, the aircraft comprising: a fuselage extending between the forward end of the aircraft and the aft end of the aircraft; a wing assembly extending laterally outwardly with respect to the longitudinal centerline from a portion of the fuselage; an unducted turbofan engine; and a pylon fairing that connects the unducted turbofan engine to the wing assembly, the pylon fairing defining a lengthwise direction, a leading edge, a trailing edge, and a chord extending from the leading edge to the trailing edge, the pylon fairing including a maximum thickness portion along the lengthwise direction of the pylon fairing located between 10% and 60% of the chord.

The aircraft of any preceding clause, wherein the maximum thickness portion along the lengthwise direction of the pylon fairing is located between 20% and 50% of the chord.

The aircraft of any preceding clause, wherein the maximum thickness portion along the lengthwise direction of the pylon fairing is located between 30% and 40% of the chord.

The aircraft of any preceding clause, wherein the maximum thickness portion is closer to the leading edge proximate the unducted turbofan engine.

The aircraft of any preceding clause, wherein the maximum thickness portion is closer to the trailing edge proximate the wing assembly.

The aircraft of any preceding clause, wherein the unducted turbofan engine includes an unducted rotating element.

An aircraft defining a longitudinal centerline and extending between a forward end and an aft end, the aircraft comprising: a fuselage extending between the forward end of the aircraft and the aft end of the aircraft; a wing assembly extending laterally outwardly with respect to the longitudinal centerline from a portion of the fuselage; an unducted turbofan engine; and a pylon fairing that connects the unducted turbofan engine to the wing assembly, the pylon fairing defining a lengthwise direction, a leading edge, a trailing edge, a first chord extending from the leading edge to the trailing edge at a first position along the lengthwise direction, and a second chord extending from the leading edge to the trailing edge at a second position along the lengthwise direction, the pylon fairing including a first maximum thickness portion at a first percentage of the first chord and a second maximum thickness portion at a second percentage of the second chord, wherein the first percentage is different than the second percentage.

The aircraft of any preceding clause, wherein the first maximum thickness portion is located between 30% and 60% of the first chord.

The aircraft of any preceding clause, wherein the second maximum thickness portion is located between 10% and 40% of the second chord.

The aircraft of any preceding clause, wherein the first maximum thickness portion is located a first distance from the leading edge, wherein the second maximum thickness portion is located a second distance from the leading edge, and wherein the second distance is less than the first distance.

The aircraft of any preceding clause, wherein the unducted turbofan engine includes an unducted rotating element.

An aircraft defining a longitudinal centerline and extending between a forward end and an aft end, the aircraft comprising: a fuselage extending longitudinally between the forward end of the aircraft and the aft end of the aircraft; a first wing assembly extending laterally outwardly with respect to the longitudinal centerline from a portion of the fuselage; a first unducted turbofan engine; and a first pylon fairing that connects the first unducted turbofan engine to the first wing assembly, the first pylon fairing having a first pressure side and a first suction side, the first pressure side of the first pylon fairing defining a first shape, and the first suction side of the first pylon fairing defining a second shape different than the first shape.

The aircraft of any preceding clause, wherein the first pylon fairing defines a lengthwise direction, a leading edge, a trailing edge, and a chord extending from the leading edge to the trailing edge, and wherein the first shape and the second shape are different at a common location along the lengthwise direction of the first pylon fairing.

The aircraft of any preceding clause, wherein the first wing assembly extends laterally outwardly with respect to the longitudinal centerline from a starboard side of the fuselage.

The aircraft of any preceding clause, further comprising a second wing assembly extending laterally outwardly with respect to the longitudinal centerline from a port side of the fuselage.

The aircraft of any preceding clause, further comprising a second unducted turbofan engine; and a second pylon fairing that connects the second unducted turbofan engine to the second wing assembly, the second pylon fairing having a second pressure side and a second suction side, the second pressure side of the second pylon fairing defining a third shape, and the second suction side of the second pylon fairing defining a fourth shape different than the third shape.

The aircraft of any preceding clause, wherein the third shape and the first shape are the same.

The aircraft of any preceding clause, wherein the third shape and the first shape are different.

The aircraft of any preceding clause, wherein the fourth shape and the second shape are the same.

The aircraft of any preceding clause, wherein the fourth shape and the second shape are different.

The aircraft of any preceding clause, wherein the first unducted turbofan engine includes a first unducted rotating element.

An aircraft defining a longitudinal centerline and extending between a forward end and an aft end, the aircraft comprising: a fuselage extending longitudinally between the forward end of the aircraft and the aft end of the aircraft; a wing assembly extending laterally outwardly with respect to the longitudinal centerline from a portion of the fuselage; an unducted turbofan engine including an unducted fan defining a fan diameter; and a pylon fairing that connects the unducted turbofan engine to the wing assembly, the pylon fairing defining a leading edge and including a first inflection point along the leading edge, the first inflection point defining a first radius of curvature that is less than 5 times the fan diameter and greater than 0.1 times the fan diameter.

The aircraft of any preceding clause, wherein the first inflection point is located at a position closer to the unducted turbofan engine than the wing assembly.

The aircraft of any preceding clause, wherein the pylon fairing includes a cantilevered stator vane.

The aircraft of any preceding clause, wherein the leading edge of the pylon fairing defines a duckbill shape.

The aircraft of any preceding clause, wherein the pylon fairing includes a second inflection point along the leading edge downstream of the first inflection point, the second inflection point defining a second radius of curvature that is less than 3 times the fan diameter and greater than 0.1 times the fan diameter.

The aircraft of any preceding clause, wherein the pylon fairing includes a third inflection point along the leading edge downstream of the second inflection point, the third inflection point defining a third radius of curvature that is less than 3 times the fan diameter and greater than 0.1 times the fan diameter.

An open rotor pylon system for an aircraft defining a longitudinal centerline and extending between a forward end and an aft end, the aircraft comprising a fuselage extending longitudinally between the forward end of the aircraft and the aft end of the aircraft; a wing assembly extending laterally outwardly with respect to the longitudinal centerline from a portion of the fuselage; and an unducted turbofan engine including an unducted fan defining a fan diameter, the open rotor pylon system comprising: a pylon fairing that connects the unducted turbofan engine to the wing assembly, the pylon fairing defining a leading edge and including a first inflection point along the leading edge, the first inflection point defining a first radius of curvature that is less than 5 times the fan diameter and greater than 0.1 times the fan diameter.

The open rotor pylon system of any preceding clause, wherein the first inflection point is located at a position closer to the unducted turbofan engine than the wing assembly.

The open rotor pylon system of any preceding clause, wherein the pylon fairing includes a cantilevered stator vane.

The open rotor pylon system of any preceding clause, wherein the leading edge of the pylon fairing defines a duckbill shape.

The open rotor pylon system of any preceding clause, wherein the pylon fairing includes a second inflection point along the leading edge downstream of the first inflection point, the second inflection point defining a second radius of curvature that is less than 3 times the fan diameter and greater than 0.1 times the fan diameter.

The open rotor pylon system of any preceding clause, wherein the pylon fairing includes a third inflection point along the leading edge downstream of the second inflection point, the third inflection point defining a third radius of curvature that is less than 3 times the fan diameter and greater than 0.1 times the fan diameter.

An aircraft defining a longitudinal centerline and extending between a forward end and an aft end, the aircraft comprising: a fuselage extending longitudinally between the forward end of the aircraft and the aft end of the aircraft; a wing assembly extending laterally outwardly with respect to the longitudinal centerline from a portion of the fuselage; an unducted turbofan engine including an outlet guide vane having a leading edge and a trailing edge; and a pylon fairing that connects the unducted turbofan engine to the wing assembly, the pylon fairing having a forwardmost point upstream of the trailing edge of the outlet guide vane.

The aircraft of any preceding clause, wherein the unducted turbofan engine includes a forward compressor frame having a mount, and the forwardmost point of the pylon fairing is upstream of the mount.

The aircraft of any preceding clause, wherein the forwardmost point of the pylon fairing covers the mount of the forward compressor frame.

The aircraft of any preceding clause, wherein the forwardmost point of the pylon fairing extends to an inlet lip of the unducted turbofan engine.

The aircraft of any preceding clause, wherein the pylon fairing includes a rearmost point that extends to a core nozzle exit of the unducted turbofan engine.

The aircraft of any preceding clause, wherein the unducted turbofan engine includes an unducted rotating element.

The aircraft of any preceding clause, wherein the pylon fairing defines a pylon fairing leading edge and includes a first inflection point along the pylon fairing leading edge, the first inflection point defining a first radius of curvature that is less than 5 times the fan diameter and greater than 0.1 times the fan diameter.

The aircraft of any preceding clause, wherein the pylon fairing includes a second inflection point along the pylon fairing leading edge downstream of the first inflection point, the second inflection point defining a second radius of curvature that is less than 3 times the fan diameter and greater than 0.1 times the fan diameter.

An aircraft defining a longitudinal centerline and extending between a forward end and an aft end, the aircraft comprising: a fuselage extending longitudinally between the forward end of the aircraft and the aft end of the aircraft; a wing assembly extending laterally outwardly with respect to the longitudinal centerline from a portion of the fuselage; an unducted turbofan engine including an unducted fan that defines a plurality of fan wakes; and a pylon fairing that connects the unducted turbofan engine to the wing assembly, the pylon fairing defining a pylon fairing dihedral, wherein the pylon fairing dihedral is in a direction opposite the sheared profile of fan wakes arriving at the pylon leading edge.

The aircraft of any preceding clause, wherein the pylon fairing defines a leading edge, and wherein the pylon fairing dihedral is at the leading edge.

The aircraft of any preceding clause, wherein the pylon fairing dihedral extends a length of the leading edge of the pylon fairing.

The aircraft of any preceding clause, wherein the pylon fairing dihedral extends an entirety of the length of the leading edge of the pylon fairing.

The aircraft of any preceding clause, wherein the pylon fairing includes a pylon fairing body downstream of the leading edge.

The aircraft of any preceding clause, wherein the pylon fairing body downstream of the leading edge is radially aligned.

The aircraft of any preceding clause, wherein the pylon fairing dihedral is configured to increase a phasing or rate of time of the fan wake interaction with the pylon fairing leading edge.

The aircraft of any preceding clause, wherein the unducted turbofan engine includes an unducted rotating element.

The aircraft of any preceding clause, wherein the unducted fan includes a fan blade that rotates in a first direction.

The aircraft of any preceding clause, wherein the pylon fairing dihedral is in the first direction from a base to a top, and wherein the fan wakes are sheared in a second direction opposite the first direction from a root to a tip.

An aircraft defining a longitudinal centerline and extending between a forward end and an aft end, the aircraft comprising: a fuselage extending between the forward end of the aircraft and the aft end of the aircraft; a wing assembly extending laterally outwardly with respect to the longitudinal centerline from a portion of the fuselage; an unducted turbofan engine including an unducted fan that defines a plurality of fan wakes during operating of the unducted turbofan engine having a sheared profile; and a pylon fairing that connects the unducted turbofan engine to the wing assembly, the pylon fairing defining a pylon fairing dihedral, wherein the pylon fairing dihedral is in a direction opposite the sheared profile of fan wakes upon arrival at the pylon leading edge.

The aircraft of any preceding clause, wherein the pylon fairing defines a leading edge, and wherein the pylon fairing dihedral is at the leading edge.

The aircraft of any preceding clause, wherein the pylon fairing dihedral extends a length of the leading edge of the pylon fairing.

The aircraft of any preceding clause, wherein the pylon fairing dihedral extends an entirety of the length of the leading edge of the pylon fairing.

The aircraft of any preceding clause, wherein the pylon fairing includes a pylon fairing body downstream of the leading edge.

The aircraft of any preceding clause, wherein the pylon fairing body downstream of the leading edge is radially aligned.

The aircraft of any preceding clause, wherein the pylon fairing dihedral is configured to increase a phasing or rate of time of the fan wake interactions with the pylon fairing leading edge.

The aircraft of any preceding clause, wherein the unducted turbofan engine includes an unducted rotating element.

The aircraft of any preceding clause, wherein the unducted fan includes a fan blade that rotates in a first direction.

The aircraft of any preceding clause, wherein the pylon fairing dihedral is in the first direction from a base to a top, and wherein the sheared profiles of fan wakes are leaned in a second direction opposite the first direction from a root to a tip.

An open rotor pylon system for an aircraft defining a longitudinal centerline and extending between a forward end and an aft end, the aircraft comprising a fuselage extending between the forward end of the aircraft and the aft end of the aircraft; a wing assembly extending laterally outwardly with respect to the longitudinal centerline from a portion of the fuselage; an unducted turbofan engine including an unducted fan that defines a plurality of fan wakes, the open rotor pylon system comprising: a pylon fairing that connects the unducted turbofan engine to the wing assembly, the pylon fairing defining a pylon fairing dihedral, wherein the pylon fairing dihedral is in a direction opposite a lean of the fan wakes upon arrival at a leading edge of the pylon fairing.

The open rotor pylon system of any preceding clause, wherein the pylon fairing defines a leading edge, and wherein the pylon fairing dihedral is at the leading edge.

The open rotor pylon system of any preceding clause, wherein the pylon fairing dihedral extends a length of the leading edge of the pylon fairing.

The open rotor pylon system of any preceding clause, wherein the pylon fairing dihedral extends an entirety of the length of the leading edge of the pylon fairing.

The open rotor pylon system of any preceding clause, wherein the pylon fairing includes a pylon fairing body downstream of the leading edge.

The open rotor pylon system of any preceding clause, wherein the pylon fairing body downstream of the leading edge is radially aligned.

The open rotor pylon system of any preceding clause, wherein the pylon fairing dihedral is configured to increase a phasing or rate of time of the fan wake interactions with the pylon fairing leading edge.

The open rotor pylon system of any preceding clause, wherein the unducted turbofan engine includes an unducted rotating element.

The open rotor pylon system of any preceding clause, wherein the unducted fan includes a fan blade that rotates in a first direction.

The open rotor pylon system of any preceding clause, wherein the pylon fairing dihedral is in the first direction from a base to a top, and wherein the fan wakes are leaned in a second direction opposite the first direction from a root to a tip.

An open rotor pylon system for an aircraft defining a longitudinal centerline and extending between a forward end and an aft end, the aircraft comprising a fuselage extending longitudinally between the forward end of the aircraft and the aft end of the aircraft; a wing assembly extending laterally outwardly with respect to the longitudinal centerline from a portion of the fuselage; and an unducted turbofan engine, the open rotor pylon system comprising: a pylon fairing that connects the unducted turbofan engine to the wing assembly, the pylon fairing defining a lengthwise direction and comprising a leading edge section, the leading edge section defining a leading edge camber that varies along the lengthwise direction of the pylon fairing.

The open rotor pylon system of any preceding clause, wherein the unducted turbofan engine includes an unducted fan having a fan blade that extends outward from an engine hub to a fan blade tip.

The open rotor pylon system of any preceding clause, wherein the leading edge camber decreases from the engine hub to the fan blade tip.

The open rotor pylon system of any preceding clause, wherein the leading edge camber is a maximum at the engine hub.

The open rotor pylon system of any preceding clause, wherein the leading edge camber is a minimum at the fan blade tip.

The open rotor pylon system of any preceding clause, wherein the leading edge section defines a leading edge angle that is defined as an angle between the leading edge camber and the engine axial direction.

The open rotor pylon system of any preceding clause, wherein the leading edge angle is between approximately 5 degrees and approximately 60 degrees.

The open rotor pylon system of any preceding clause, wherein the leading edge angle is between approximately 10 degrees and approximately 50 degrees.

The open rotor pylon system of any preceding clause, wherein the leading edge angle is between approximately 15 degrees and approximately 45 degrees.

The open rotor pylon system of any preceding clause, wherein the pierce point is an intersection point between the mean camber line and the surface of the pylon fairing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims

What is claimed is:

1. An aircraft defining a longitudinal centerline and extending between a forward end and an aft end, the aircraft comprising:
   a fuselage extending between the forward end of the aircraft and the aft end of the aircraft;
   a wing assembly extending laterally outwardly with respect to the longitudinal centerline from a portion of the fuselage;
   an unducted turbofan engine including an unducted fan defining a fan diameter and including fan blades rotatable about the longitudinal centerline and fan guide vanes not rotatable about the longitudinal centerline; and
   a pylon fairing that connects the unducted turbofan engine to the wing assembly, the pylon fairing having a forwardmost point upstream of a trailing edge of the fan guide vanes, the pylon fairing defining a leading edge and including a first inflection point along the leading edge, the first inflection point defining a first radius of curvature that is less than 5 times the fan diameter and greater than 0.1 times the fan diameter to reduce drag associated with supersonic flow at cruise conditions, and a second inflection point along the leading edge downstream of the first inflection point, the second inflection point defining a second radius of curvature that is less than 3 times the fan diameter and greater than 0.1 times the fan diameter to provide control of a flow of air over the leading edge of the pylon fairing into the wing assembly.

2. The aircraft of claim 1, wherein the first inflection point is located at a position closer to the unducted turbofan engine than the wing assembly.

3. The aircraft of claim 1, wherein the pylon fairing includes a cantilevered stator vane.

4. The aircraft of claim 1, wherein the leading edge of the pylon fairing defines a duckbill shape.

5. The aircraft of claim 1, wherein the pylon fairing includes a third inflection point along the leading edge downstream of the second inflection point, the third inflection point defining a third radius of curvature that is less than 3 times the fan diameter and greater than 0.1 times the fan diameter.

6. An open rotor pylon system for an aircraft defining a longitudinal centerline and extending between a forward end and an aft end, the aircraft comprising a fuselage extending between the forward end of the aircraft and the aft end of the aircraft; a wing assembly extending laterally outwardly with respect to the longitudinal centerline from a portion of the fuselage; and an unducted turbofan engine including an unducted fan defining a fan diameter and including fan blades rotatable about the longitudinal centerline and fan guide vanes not rotatable about the longitudinal centerline, the open rotor pylon system comprising:
   a pylon fairing that connects the unducted turbofan engine to the wing assembly, the pylon fairing having a forwardmost point upstream of a trailing edge of the fan guide vanes, the pylon fairing defining a leading edge and including a first inflection point along the leading edge, the first inflection point defining a first radius of curvature that is less than 5 times the fan diameter and greater than 0.1 times the fan diameter to reduce drag associated with supersonic flow at cruise conditions, and a second inflection point along the leading edge downstream of the first inflection point, the second inflection point defining a second radius of curvature that is less than 3 times the fan diameter and greater than 0.1 times the fan diameter to provide control of a flow of air over the leading edge of the pylon fairing into the wing assembly.

7. The open rotor pylon system of claim 6, wherein the first inflection point is located at a position closer to the unducted turbofan engine than the wing assembly.

8. The open rotor pylon system of claim 6, wherein the pylon fairing includes a cantilevered stator vane.

9. The open rotor pylon system of claim 6, wherein the leading edge of the pylon fairing defines a duckbill shape.

10. The open rotor pylon system of claim 6, wherein the pylon fairing includes a third inflection point along the leading edge downstream of the second inflection point, the third inflection point defining a third radius of curvature that is less than 3 times the fan diameter and greater than 0.1 times the fan diameter.

11. An aircraft defining a longitudinal centerline and extending between a forward end and an aft end, the aircraft comprising:
   a fuselage extending between the forward end of the aircraft and the aft end of the aircraft;
   a wing assembly extending laterally outwardly with respect to the longitudinal centerline from a portion of the fuselage;
   an unducted turbofan engine including an unducted fan defining a fan diameter and including fan blades and an outlet guide vane having a leading edge and a trailing edge, wherein the fan blades are rotatable about the longitudinal centerline and the outlet guide vane is not rotatable about the longitudinal centerline; and a pylon fairing that connects the unducted turbofan engine to the wing assembly, the pylon fairing having a forwardmost point upstream of the trailing edge of the outlet guide vane, wherein the pylon fairing defines a pylon fairing leading edge and includes a first inflection point along the pylon fairing leading edge, the first inflection point defining a first radius of curvature that is less than 5 times the fan diameter and greater than 0.1 times the fan diameter to reduce drag associated with supersonic flow at cruise conditions, and a second inflection point along the pylon fairing leading edge downstream of the first inflection point, the second inflection point defining a second radius of curvature that is less than 3 times the fan diameter and greater than 0.1 times the fan diameter to provide control of a flow of air over the pylon fairing leading edge into the wing assembly.

12. The aircraft of claim 11, wherein the unducted turbofan engine includes a forward compressor frame having a mount, and the forwardmost point of the pylon fairing is upstream of the mount.

13. The aircraft of claim 12, wherein the forwardmost point of the pylon fairing covers the mount of the forward compressor frame.

14. The aircraft of claim 11, wherein the forwardmost point of the pylon fairing extends to an inlet lip of the unducted turbofan engine.

15. The aircraft of claim 11, wherein the pylon fairing includes a rearmost point that extends to a core nozzle exit of the unducted turbofan engine.

16. The aircraft of claim 11, wherein the unducted turbofan engine includes an unducted rotating element.

* * * * *